United States Patent
Xue et al.

(10) Patent No.: US 10,932,255 B2
(45) Date of Patent: Feb. 23, 2021

(54) RESOURCE INDICATION METHOD AND APPARATUS, AND UPLINK CONTROL SIGNAL TRANSMISSION METHOD AND APPARATUS

(71) Applicant: HUAWEI TECHNOLOGIES CO., LTD., Guangdong (CN)

(72) Inventors: Yifan Xue, Shenzhen (CN); Jian Wang, Beijing (CN); Da Wang, Shenzhen (CN); Yun Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/347,161

(22) PCT Filed: Nov. 3, 2016

(86) PCT No.: PCT/CN2016/104457
§ 371 (c)(1),
(2) Date: May 2, 2019

(87) PCT Pub. No.: WO2018/081982
PCT Pub. Date: May 11, 2018

(65) Prior Publication Data
US 2020/0068544 A1    Feb. 27, 2020

(51) Int. Cl.
H04L 12/28 (2006.01)
H04W 72/04 (2009.01)
H04J 1/16 (2006.01)

(52) U.S. Cl.
CPC ....... *H04W 72/044* (2013.01); *H04W 72/042* (2013.01); *H04W 72/0413* (2013.01)

(58) Field of Classification Search
CPC ... H04W 52/04; H04W 52/18; H04W 52/146; H04W 52/242; H04W 72/02; H04W 72/0413; H04W 72/044
(Continued)

(56) References Cited

U.S. PATENT DOCUMENTS 9,100,148 B2   8/2015   Cho et al.
9,112,670 B2   8/2015   Song et al.
(Continued)

FOREIGN PATENT DOCUMENTS

CN   102281593 A   12/2011
CN   105099634 A   11/2015
(Continued)

OTHER PUBLICATIONS

Extended European Search Report issued in European Application No. 16920468.2 dated Aug. 19, 2019, 9 pages.
(Continued)

*Primary Examiner* — John Pezzlo
(74) *Attorney, Agent, or Firm* — Fish & Richardson P.C.

(57) ABSTRACT

Example resource indication methods and apparatus are described. One example method includes determining a resource used by a terminal to send an uplink control signal by a base station. The base station sends indication information to the terminal, where the indication information is used to indicate the resource or a target parameter. The target parameter includes at least one of parameters used by the terminal to determine the resource. The described methods are applicable to the field of communications technologies.

17 Claims, 14 Drawing Sheets

(58) Field of Classification Search
USPC .......................................... 370/252, 329, 386
See application file for complete search history.

(56) References Cited

U.S. PATENT DOCUMENTS

| | | | |
|---|---|---|---|
| 2009/0190537 A1 | 7/2009 | Hwang et al. | |
| 2012/0039294 A1 | 2/2012 | Yan et al. | |
| 2014/0119336 A1 | 5/2014 | Liu et al. | |
| 2014/0177531 A1* | 6/2014 | Imamura | H04L 5/0035 370/328 |
| 2014/0233477 A1 | 8/2014 | Chu | |
| 2014/0295909 A1* | 10/2014 | Ouchi | H04W 52/40 455/522 |
| 2015/0257150 A1 | 9/2015 | Yi et al. | |
| 2016/0183276 A1* | 6/2016 | Marinier | H04W 72/12 370/329 |
| 2017/0135105 A1 | 5/2017 | Li et al. | |

FOREIGN PATENT DOCUMENTS

| | | |
|---|---|---|
| EP | 2903374 A1 | 8/2015 |
| JP | 2013098949 A | 5/2013 |
| JP | 2015510365 A | 4/2015 |
| JP | 2015527781 A | 9/2015 |
| KR | 20130116874 A | 10/2013 |
| KR | 20140091712 A | 7/2014 |
| RU | 2497312 C2 | 10/2013 |
| WO | 2013127466 A1 | 9/2013 |
| WO | 2014007548 A1 | 1/2014 |
| WO | 2016036158 A1 | 3/2016 |
| WO | 2016171748 A1 | 10/2016 |

OTHER PUBLICATIONS

R1-1609277—LG Electronics, "Discussion on UL control channel design for NR," 3GPP TSG RAN WG1 Meeting#86 bis, Lisbon, Portugal, Oct. 10-14, 2016, 5 pages.
3GPP TS 36.213 V14.0.0 (Sep. 2016), "3rd Generation Partnership Project; Technical Specification Group Radio Access Network; Evolved Universal Terrestrial Radio Access (E-UTRA); Physical layer procedures (Release 14)," Technical Specification, Sep. 2016, 406 pages.
PCT International Search Report and Written Opinion issued in International Application No. PCT/CN2016/104457 dated Jul. 31, 2017, 18 pages (with English translation).
R1-1608792—CATT, "NR UL Control Channel Design Considerations," 3GPP TSG RAN WG1 Meeting #86bis, Lisbon, Portugal, Oct. 10-14, 2016, 3 pages.
R1-1609538—Intel Corporation, "Resource allocation for NR uplink control channel," 3GPP TSG-RAN WG1 #86bis, Lisbon, Portugal, Oct. 10-14, 2016, 5 pages.
R1-166555—Intel Corporation, "Frame structure design for NR," 3GPP TSG RAN WG1 Meeting #86, Gothenburg, Sweden, Aug. 22-26, 2016, 8 pages.
Office Action issued in Russian Application No. 2019116810 dated Feb. 13, 2020, 15 pages (With English Translation).
Office Action issued in Japanese Application No. 2019-523574 dated Jul. 7, 2020, 11 pages (with English translation).
Office Action issued in Korean Application No. 2019-7015483 dated Jun. 8, 2020, 13 pages (with English translation).
LG Electronics, "Discussion on frame structure for NR," 3GPP TSG RAN WG1 Meeting #84bis, R1-162519, Busan, Korea, Apr. 11-15, 2016, 6 pages.
LG Electronics, "Physical layer aspect of processing time for shortened TTI," 3GPP TSG RAN WG1 Meeting #84bis, R1-162511, Busan, Korea, Apr. 11-15, 2016, 6 pages.
Office Action issued in Australian Application No. 2016424838 dated Aug. 26, 2020, 3 pages.
Panasonic, "Uplink Acknowledgement timing for HSDPA," RAN WG2 ad-hoc meeting on HSDPA, Tdoc 12A010062, Sophia Antipolis, France, Nov. 5-6, 2001, 12 pages.
Office Action issued in Indian Application No. 201927018599 dated Oct. 29, 2020, 6 pages.
Dahlman et al. (translated by Bong-Yeol, Jo), "4G LTE/LTE-A Mobile Communication System," Hongneung Science Publishing House, Feb. 2013, 16 pages (with English translation).
Office Action issued in Korean Application No. 2019-7015483 dated Dec. 29, 2020, 7 pages (with English translation).

* cited by examiner

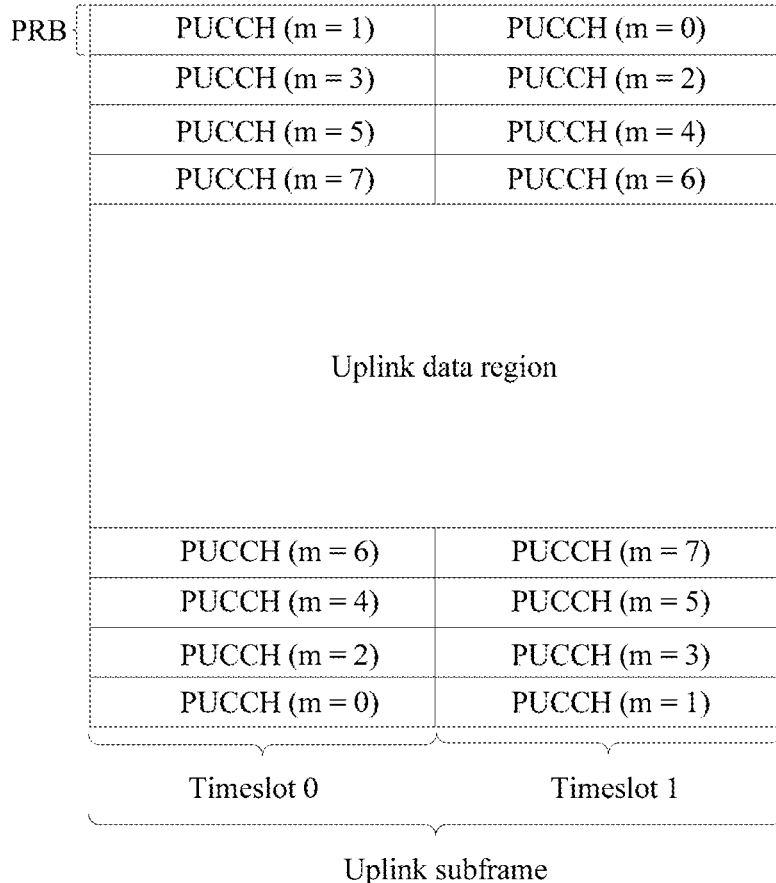

FIG. 9

Determine a resource used by a terminal to send an uplink control signal, where the resource used by the terminal to send the uplink control signal includes k resource element groups, and the resource element group includes m resource elements, where k is a positive integer, and m is a positive integer  /1001

Transmit the uplink control signal on the resource used by the terminal to send the uplink control signal  /1002

FIG. 10

RESOURCE INDICATION METHOD AND APPARATUS, AND UPLINK CONTROL SIGNAL TRANSMISSION METHOD AND APPARATUS

CROSS-REFERENCE TO RELATED APPLICATIONS

This application is a national stage of International Application No. PCT/CN2016/104457, filed on Nov. 3, 2016, which is hereby incorporated by reference in its entirety.

TECHNICAL FIELD

The present invention relates to the field of communications technologies, and in particular, to a resource indication method and apparatus, and an uplink control signal transmission method and apparatus.

BACKGROUND

In a Long Term Evolution (Long Term Evolution, LTE for short) system, a base station sends downlink data to a plurality of user equipments (User Equipment, UE for short) in one downlink subframe. Each of the plurality of UEs feeds back, in another preconfigured uplink subframe, acknowledgement (Acknowledgement, ACK for short)/negative acknowledgement (Negative Acknowledgement, NACK for short) information for the downlink data received by the UE. The UE calculates an index value of a physical uplink control channel (Physical Uplink Control Channel, PUCCH for short) resource based on a location of a first control channel element (Control Channel Element, CCE for short) occupied by downlink control signaling that is used by the base station to schedule downlink data for the UE; and feeds back the ACK/NACK information for the downlink data on the PUCCH resource that is corresponding to the index value and that is in the preconfigured uplink subframe.

A higher requirement is imposed on flexibility of resource scheduling in 5G (5th Generation) New Radio (5G New Radio, 5G NR for short). Therefore, for downlink data sent by a base station to different terminals in different subframes/timeslots, these different terminals may need to feed back ACK/NACK information for the downlink data in a same subframe/timeslot. Provided that the method in the LTE system is directly used to determine and indicate a resource for sending ACK/NACK information for downlink data, two terminals determine a same resource if locations of first CCEs occupied by downlink control signaling used to schedule the downlink data for the two terminals in two subframes/timeslots are the same. In other words, the two terminals need to feed back the ACK/NACK information for the downlink data on a same resource of a same subframe/timeslot, thereby causing a resource conflict.

Certainly, the base station may alternatively make the locations of the first CCEs occupied by the downlink control signaling used to schedule the downlink data for the two terminals different. However, this definitely means that locations of first CCEs occupied by downlink control signaling that is used by the base station to schedule downlink data for any two terminals that feed back ACK/NACK information for the downlink data in a same subframe need to be different. As a result, the base station cannot flexibly schedule resources.

SUMMARY

Embodiments of the present invention provide a resource indication method and apparatus, and an uplink control signal transmission method and apparatus, to resolve a problem that a resource conflict occurs if a method for determining a resource for sending an uplink control signal in an LTE system is used in a 5G communications system.

To achieve the foregoing objective, the following technical solutions are used in the embodiments of the present invention.

According to a first aspect, a resource indication method is provided, including: determining, by a base station, a resource used by a terminal to send an uplink control signal; and sending, by the base station, indication information to the terminal, where the indication information is used to indicate the resource; or the indication information is used to indicate a target parameter, and the target parameter includes at least one of parameters used by the terminal to determine the resource.

According to the method provided in the first aspect, the base station may indicate, to the terminal, the resource used to send the uplink control signal, so that the terminal determines the resource used to send the uplink control signal; or the base station may indicate, to the terminal, the at least one parameter used to determine the resource, so that the terminal determines the resource based on the at least one parameter. The terminal no longer determines, by using a location of a first CCE occupied by downlink control signaling used to schedule downlink data for the terminal, the resource used to send the uplink control signal. Therefore, for downlink data sent by the base station to two terminals in different subframes/timeslots, if information used to indicate whether downlink data transmission is correct or incorrect needs to be fed back in a same subframe/timeslot, the base station may still allocate, to the two terminals, different resources for sending uplink control signals, even if locations of first CCEs occupied by downlink control signaling used to schedule the downlink data for the two terminals in different subframes/timeslots are the same. The base station indicates, to the two terminals, the resources used to send the uplink control signals, or at least one parameter used to determine the resources, so that the two terminals determine the different resources. This prevents a resource conflict while ensuring flexible resource scheduling of the base station.

With reference to the first aspect, in a first possible implementation, the parameters used to determine the resource include a first parameter and a second parameter; and the first parameter is used to determine a resource group, where the resource group includes the resource, and the second parameter is used to determine the resource in the resource group; or the first parameter is used to determine a basic resource index value of the resource, and the second parameter is used to determine an offset resource index value of the resource.

With reference to the first possible implementation of the first aspect, in a second possible implementation, the target parameter includes the first parameter, and the determining, by a base station, a resource used by a terminal to send an uplink control signal includes: determining, by the base station, the first parameter; determining, by the base station, the second parameter based on a downlink resource, where the downlink resource includes one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal; and determining, by the base station based on the first parameter and the second parameter, the resource used by the terminal to send the uplink control signal.

With reference to the second possible implementation of the first aspect, in a third possible implementation, the determining, by the base station, the second parameter based on a downlink resource includes: determining, by the base station, the second parameter based on a start location or an end location of the downlink resource.

With reference to the first possible implementation of the first aspect, in a fourth possible implementation, the target parameter includes the second parameter, and the determining, by a base station, a resource used by a terminal to send an uplink control signal includes: determining, by the base station, the first parameter based on a downlink resource, where the downlink resource includes one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal; determining, by the base station, the second parameter; and determining, by the base station based on the first parameter and the second parameter, the resource used by the terminal to send the uplink control signal.

With reference to the fourth possible implementation of the first aspect, in a fifth possible implementation, the determining, by the base station, the first parameter based on a downlink resource includes: determining, by the base station, the first parameter based on a start location or an end location of the downlink resource.

With reference to any one of the first aspect, or the first to the fifth possible implementations of the first aspect, in a sixth possible implementation, the sending, by the base station, indication information to the terminal includes: sending, by the base station to the terminal, an RRC message or downlink control signaling that includes the indication information.

With reference to any one of the first aspect, or the first to the sixth possible implementations of the first aspect, in a seventh possible implementation, the resource includes k resource element groups, and the resource element group includes m resource elements, where k is a positive integer, and m is a positive integer.

According to a second aspect, a resource indication method is provided, including: receiving, by a terminal, indication information sent by a base station; and determining, by the terminal based on the indication information, a resource used by the terminal to send an uplink control signal; or determining, by the terminal based on the indication information, a target parameter, where the target parameter includes at least one of parameters used to determine the resource.

According to the method provided in the second aspect, the terminal no longer determines, by using a location of a first CCE occupied by downlink control signaling used to schedule downlink data for the terminal, the resource used to send the uplink control signal; but determines, based on the resource indicated by the base station, the resource used to send the uplink control signal, or determines, based on the at least one parameter indicated by the terminal, the resource used to send the uplink control signal. Therefore, for downlink data sent by the base station to two terminals in different subframes/timeslots, if information used to indicate whether downlink data transmission is correct or incorrect needs to be fed back in a same subframe/timeslot, the base station may still allocate, to the two terminals, different resources for sending uplink control signals, even if locations of first CCEs occupied by downlink control signaling used to schedule the downlink data for the two terminals in different subframes/timeslots are the same. The base station indicates, to the two terminals, the resources used to send the uplink control signals, or at least one parameter used to determine the resources, so that the two terminals determine the different resources. This prevents a resource conflict while ensuring flexible resource scheduling of the base station.

With reference to the second aspect, in a first possible implementation, the parameters used to determine the resource include a first parameter and a second parameter; and the first parameter is used to determine a resource group, where the resource group includes the resource, and the second parameter is used to determine the resource in the resource group; or the first parameter is used to determine a basic resource index value of the resource, and the second parameter is used to determine an offset resource index value of the resource.

With reference to the first possible implementation of the second aspect, in a second possible implementation, the target parameter includes the first parameter, and the method further includes: determining, by the terminal, the second parameter based on a downlink resource, where the downlink resource includes one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal.

With reference to the second possible implementation of the second aspect, in a third possible implementation, the determining, by the terminal, the second parameter based on a downlink resource includes: determining, by the terminal, the second parameter based on a start location or an end location of the downlink resource.

With reference to the first possible implementation of the second aspect, in a fourth possible implementation, the target parameter includes the second parameter, and the method further includes: determining, by the terminal, the first parameter based on a downlink resource, where the downlink resource includes one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal.

With reference to the fourth possible implementation of the second aspect, in a fifth possible implementation, the terminal determines the first parameter based on the downlink resource, and the method further includes: determining, by the terminal, the first parameter based on a start location or an end location of the downlink resource.

With reference to the second or the third possible implementation of the second aspect, in a sixth possible implementation, the method further includes: determining, by the terminal, the resource based on the target parameter and the second parameter.

With reference to the fourth or the fifth possible implementation of the second aspect, in a seventh possible implementation, the method further includes: determining, by the terminal, the resource based on the target parameter and the first parameter.

With reference to any one of the second aspect, or the first to the seventh possible implementations of the second aspect, in an eighth possible implementation, the resource includes k resource element groups, and the resource element group includes m resource elements, where k is a positive integer, and m is a positive integer.

With reference to the eighth possible implementation of the second aspect, in a ninth possible implementation, the uplink control signal is information used to indicate whether downlink data transmission is correct or incorrect, and the method further includes: determining, by the terminal based on a value of m, a codeword corresponding to the resource; performing, by the terminal, channel coding with a rate of 1/k on the information used to indicate whether downlink data transmission is correct or incorrect, to obtain a bit sequence with a length of k; performing, by the terminal, BPSK modulation on the bit sequence with a length of k, to obtain a modulated symbol sequence with a length of k; performing, by the terminal, spread spectrum on the modulated symbol sequence with a length of k by using the codeword, to obtain k sequences with a length of m; and respectively mapping, by the terminal, the k sequences with a length of m to the k resource element groups in the resource.

The BPSK modulation can be used to improve anti-interference and anti-noise performance of the information used to indicate whether downlink data transmission is correct or incorrect, and reduce a bit error rate.

With reference to the ninth possible implementation of the second aspect, in a tenth possible implementation, the information used to indicate whether downlink data transmission is correct or incorrect is information obtained by performing an AND operation on a plurality of pieces of information used to indicate whether downlink data transmission is correct or incorrect.

According to a third aspect, an uplink control signal transmission method is provided, including: determining, based on a downlink resource, a resource used by a terminal to send an uplink control signal, where the downlink resource includes one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal; and transmitting the uplink control signal on the resource.

According to the method provided in the third aspect, a base station and the terminal may determine, based on one or more downlink resources of the frequency domain resource of the downlink control signal corresponding to the terminal, the time domain resource of the downlink control signal, the code domain resource of the downlink control signal, the port number of the downlink control signal, the frequency domain resource of the downlink data corresponding to the downlink control signal, the time domain resource of the downlink data corresponding to the downlink control signal, the code domain resource of the downlink data corresponding to the downlink control signal, and the port number of the downlink data corresponding to the downlink control signal, the resource used by the terminal to send the uplink control signal. Therefore, for different terminals that need to feed back, in a same subframe/timeslot, information used to indicate whether downlink data transmission is correct or incorrect, the different terminals may use different downlink resources to determine resources that are used to send the information used to indicate whether downlink data transmission is correct or incorrect, thereby avoiding a resource conflict.

With reference to the third aspect, in a first possible implementation, the determining, based on a downlink resource, a resource used by a terminal to send an uplink control signal includes: determining, based on the downlink resource, a first parameter and a second parameter that are corresponding to the resource used by the terminal to send the uplink control signal, where the first parameter corresponding to the resource is used to determine a resource group, where the resource group includes the resource, and the second parameter corresponding to the resource is used to determine the resource in the resource group; or the first parameter corresponding to the resource is used to determine a basic resource index value of the resource, and the second parameter corresponding to the resource is used to determine an offset resource index value of the resource; and determining the resource based on the first parameter and the second parameter that are corresponding to the resource.

With reference to the first possible implementation of the third aspect, in a second possible implementation, the determining, based on the downlink resource, a first parameter and a second parameter that are corresponding to the resource used by the terminal to send the uplink control signal includes: determining, based on a start location or an end location of the downlink resource, the first parameter and the second parameter that are corresponding to the resource used by the terminal to send the uplink control signal.

With reference to any one of the third aspect, or the first or the second possible implementation of the third aspect, in a third possible implementation, the resource includes k resource element groups, and the resource element group includes m resource elements, where k is a positive integer, and m is a positive integer.

With reference to any one of the third aspect, or the first to the third possible implementations of the third aspect, in a fourth possible implementation, before the determining, based on a downlink resource, a resource used by a terminal to send an uplink control signal, the method further includes: receiving the downlink control signal and the downlink data corresponding to the downlink control signal that are sent by a base station.

With reference to the third possible implementation of the third aspect, in a fifth possible implementation, the uplink control signal is information used to indicate whether downlink data transmission is correct or incorrect, and the method further includes: determining, based on a value of m, a codeword corresponding to the resource; performing channel coding with a rate of 1/k on the information used to indicate whether downlink data transmission is correct or incorrect, to obtain a bit sequence with a length of k; performing BPSK modulation on the bit sequence with a length of k, to obtain a modulated symbol sequence with a length of k; performing spread spectrum on the modulated symbol sequence with a length of k by using the codeword, to obtain k sequences with a length of m; and respectively mapping the k sequences with a length of m to the k resource element groups in the resource.

The BPSK modulation can be used to improve anti-interference and anti-noise performance of the information used to indicate whether downlink data transmission is correct or incorrect, and reduce a bit error rate.

With reference to the fifth possible implementation of the third aspect, in a sixth possible implementation, the information used to indicate whether downlink data transmission is correct or incorrect is information obtained by performing an AND operation on a plurality of pieces of information used to indicate whether downlink data transmission is correct or incorrect.

According to a fourth aspect, an uplink control signal transmission method is provided, including: determining a resource used by a terminal to send an uplink control signal, where the resource includes k resource element groups, and the resource element group includes m resource elements, where k is a positive integer, and m is a positive integer; and transmitting the uplink control signal on the resource.

According to the method provided in the fourth aspect, resources that are used by different terminals to send uplink control signals and that are determined by a base station may include a same quantity or different quantities of resource element groups, and the resource element groups may include a same quantity or different quantities of resources. Compared with that in the prior art, resource scheduling is more flexible. In addition, when total resources included in an uplink control region remain unchanged, the base station may allocate, to more terminals, a resource used to send an uplink control signal, so as to more easily meet a requirement of a 5G communications system.

With reference to the fourth aspect, in a first possible implementation, the k resource element groups are nonconsecutive in frequency domain.

With reference to the fourth aspect or the first possible implementation of the fourth aspect, in a second possible implementation, values of k and m that are corresponding to the resource are determined based on content of the uplink control signal, and the content of the uplink control signal includes one or more of the following content: information used to indicate whether downlink data transmission is correct or incorrect, downlink channel state information, and an uplink scheduling request.

The values of k and m are determined based on the content of the uplink control signal, so as to dynamically adapt to different content of the uplink control signal. Compared with fixed values of k and m, this can avoid resource waste when a quantity of bits of the content of the uplink control signal is relatively small, and also ensure transmission reliability of the uplink control signal when the content of the uplink control signal has a relatively large quantity of bits.

With reference to the fourth aspect or the first possible implementation of the fourth aspect, in a third possible implementation, values of k and m that are corresponding to the resource are determined based on a service type of downlink data corresponding to the uplink control signal, and the service type of the downlink data corresponding to the uplink control signal includes one or more of the following service types: a mobile broadband service type, a low delay service type, a high reliability service type, and an Internet of Things service type.

The values of k and m are determined based on the service type of the downlink data corresponding to the uplink control signal, so as to better adapt to service requirements of different service types.

With reference to the fourth aspect or the first possible implementation of the fourth aspect, in a fourth possible implementation, values of k and m that are corresponding to the resource are determined based on uplink channel quality.

The values of k and m are determined based on the uplink channel quality, so as to avoid resource waste as far as possible while ensuring transmission reliability.

With reference to any one of the fourth aspect, or the first to the fourth possible implementations of the fourth aspect, in a fifth possible implementation, before the transmitting the uplink control signal on the resource, the method further includes: determining, based on a value of m corresponding to the resource, a codeword corresponding to the resource; and the transmitting the uplink control signal on the resource includes: transmitting the uplink control signal on the resource by using the codeword corresponding to the resource.

The uplink control signal is transmitted by using an orthogonal code, so as to transmit a plurality of uplink control signals on a same time domain resource, frequency domain resource, and antenna port, without causing mutual interference. This helps improve a system capacity, to transmit more uplink control signals.

With reference to any one of the fourth aspect, or the first to the fourth possible implementations of the fourth aspect, in a sixth possible implementation, before the transmitting the uplink control signal on the resource, the method further includes: determining, based on one or more of the resource, the content of the uplink control signal, the service type of the downlink data corresponding to the uplink control signal, and control signaling of the downlink data corresponding to the uplink control signal, an antenna port corresponding to the resource; and the transmitting the uplink control signal on the resource includes: transmitting the uplink control signal on the resource by using the antenna port corresponding to the resource.

The uplink control signal is transmitted, on the resource used by the terminal to send the uplink control signal, by using the antenna port corresponding to the resource used by the terminal to send the uplink control signal. This can further extend a system capacity, to transmit more uplink control signals.

With reference to the fifth possible implementation of the fourth aspect, in a seventh possible implementation, before the transmitting the uplink control signal on the resource by using the codeword corresponding to the resource, the method further includes: determining, based on one or more of the resource, the content of the uplink control signal, the service type of the downlink data corresponding to the uplink control signal, and control signaling of the downlink data corresponding to the uplink control signal, an antenna port corresponding to the resource; and the transmitting the uplink control signal on the resource by using the codeword corresponding to the resource includes: transmitting the uplink control signal on the resource by using the codeword and the antenna port that are corresponding to the resource.

The uplink control signal is transmitted, on the resource used by the terminal to send the uplink control signal, by using the codeword and the antenna port that are corresponding to the resource used by the terminal to send the uplink control signal. This can effectively extend the system capacity, to transmit more uplink control signals.

With reference to any one of the fourth aspect, or the first to the seventh possible implementations of the fourth aspect, in an eighth possible implementation, in the resource element group, a ratio of a quantity of resource elements used to carry data to a quantity of resource elements used to carry demodulation reference signals is 2:1; or a ratio of a quantity of resource elements included in the resource element group to a quantity of resource elements that are used to carry demodulation reference signals and that are corresponding to the resource element group is 2:1.

With reference to any one of the fourth aspect, or the first to the eighth possible implementations of the fourth aspect, in a ninth possible implementation, the method further includes: sending an indication message to the terminal, where the indication message is used to indicate the values/value of k and/or m that are/is corresponding to the resource.

With reference to any one of the fourth aspect, or the first to the eighth possible implementations of the fourth aspect, in a tenth possible implementation, before the determining a resource used by a terminal to send an uplink control signal, the method further includes: receiving an indication message sent by a base station; and determining, based on the indication message, a value of a parameter corresponding to the resource used to send the uplink control signal, where the parameter includes k and/or m; and the determining a resource used by a terminal to send an uplink control signal includes: determining the resource based on the value of the parameter corresponding to the resource.

With reference to the fifth or the seventh possible implementation of the fourth aspect, in an eleventh possible implementation, the uplink control signal is information used to indicate whether downlink data transmission is correct or incorrect, and the method further includes: performing channel coding with a rate of 1/k on the information used to indicate whether downlink data transmission is correct or incorrect, to obtain a bit sequence with a length of k; performing BPSK modulation on the bit sequence with a length of k, to obtain a modulated symbol sequence with a length of k; performing spread spectrum on the modulated symbol sequence with a length of k by using the codeword, to obtain k sequences with a length of m; and respectively mapping the k sequences with a length of m to the k resource element groups.

The BPSK modulation can be used to improve anti-interference and anti-noise performance of the information used to indicate whether downlink data transmission is correct or incorrect, and reduce a bit error rate.

With reference to the eleventh possible implementation of the fourth aspect, in a twelfth possible implementation, the information used to indicate whether downlink data transmission is correct or incorrect is information obtained by performing an AND operation on a plurality of pieces of information used to indicate whether downlink data transmission is correct or incorrect.

According to a fifth aspect, a base station is provided, including: a determining unit, configured to determine a resource used by a terminal to send an uplink control signal; and a sending unit, configured to send indication information to the terminal, where the indication information is used to indicate the resource; or the indication information is used to indicate a target parameter, and the target parameter includes at least one of parameters used by the terminal to determine the resource.

The units in the base station provided in the fifth aspect are configured to perform the method provided in the first aspect. Therefore, for a beneficial effect of the base station, refer to the beneficial effect of the method provided in the first aspect. Details are not described herein again.

With reference to the fifth aspect, in a first possible implementation, the parameters used to determine the resource include a first parameter and a second parameter; and the first parameter is used to determine a resource group, where the resource group includes the resource, and the second parameter is used to determine the resource in the resource group; or the first parameter is used to determine a basic resource index value of the resource, and the second parameter is used to determine an offset resource index value of the resource.

With reference to the first possible implementation of the fifth aspect, in a second possible implementation, the target parameter includes the first parameter, and the determining unit is specifically configured to: determine the first parameter; determine the second parameter based on a downlink resource, where the downlink resource includes one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal; and determine, based on the first parameter and the second parameter, the resource used by the terminal to send the uplink control signal.

With reference to the second possible implementation of the fifth aspect, in third possible implementation, the determining unit is specifically configured to determine the second parameter based on a start location or an end location of the downlink resource.

With reference to the first possible implementation of the fifth aspect, in a fourth possible implementation, the target parameter includes the second parameter, and the determining unit is specifically configured to: determine the first parameter based on a downlink resource, where the downlink resource includes one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal; determine the second parameter; and determine, based on the first parameter and the second parameter, the resource used by the terminal to send the uplink control signal.

With reference to the fourth possible implementation of the fifth aspect, in a fifth possible implementation, the determining unit is specifically configured to determine the first parameter based on a start location or an end location of the downlink resource.

With reference to any one of the fifth aspect, or the first to the fifth possible implementations of the fifth aspect, in a sixth possible implementation, the sending unit is specifically configured to send, to the terminal, an RRC message or downlink control signaling that includes the indication information.

With reference to any one of the fifth aspect, or the first to the sixth possible implementations of the fifth aspect, in a seventh possible implementation, the resource includes k resource element groups, and the resource element group includes m resource elements, where k is a positive integer, and m is a positive integer.

According to a sixth aspect, a terminal is provided, including: a receiving unit, configured to receive indication information sent by a base station; and a determining unit, configured to: determine, based on the indication information, a resource used by the terminal to send an uplink control signal; or determine, based on the indication information, a target parameter, where the target parameter includes at least one of parameters used to determine the resource.

The units in the terminal provided in the sixth aspect are configured to perform the method provided in the second aspect. Therefore, for a beneficial effect of the terminal, refer to the beneficial effect of the method provided in the second aspect. Details are not described herein again.

With reference to the sixth aspect, in a first possible implementation, the parameters used to determine the resource include a first parameter and a second parameter; and the first parameter is used to determine a resource group, where the resource group includes the resource, and the second parameter is used to determine the resource in the resource group; or the first parameter is used to determine a basic resource index value of the resource, and the second parameter is used to determine an offset resource index value of the resource.

With reference to the first possible implementation of the sixth aspect, in a second possible implementation, the target parameter includes the first parameter, and the determining unit is further configured to determine the second parameter based on a downlink resource, where the downlink resource includes one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal.

With reference to the second possible implementation of the sixth aspect, in third possible implementation, the determining unit is specifically configured to determine the second parameter based on a start location or an end location of the downlink resource.

With reference to the first possible implementation of the sixth aspect, in a fourth possible implementation, the target parameter includes the second parameter, and the determining unit is further configured to determine the first parameter based on a downlink resource, where the downlink resource includes one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal.

With reference to the fourth possible implementation of the sixth aspect, in a fifth possible implementation, the determining unit is specifically configured to determine the first parameter based on a start location or an end location of the downlink resource.

With reference to the second or the third possible implementation of the sixth aspect, in a sixth possible implementation, the determining unit is further configured to determine the resource based on the target parameter and the second parameter.

With reference to the fourth or the fifth possible implementation of the sixth aspect, in a seventh possible implementation, the determining unit is further configured to determine the resource based on the target parameter and the first parameter.

With reference to any one of the sixth aspect, or the first to the seventh possible implementations of the sixth aspect, in an eighth possible implementation, the resource includes k resource element groups, and the resource element group includes m resource elements, where k is a positive integer, and m is a positive integer.

With reference to the eighth possible implementation of the sixth aspect, in a ninth possible implementation, the uplink control signal is information used to indicate whether downlink data transmission is correct or incorrect, and the terminal further includes an execution unit, where the execution unit is configured to: determine, based on a value of m, a codeword corresponding to the resource; perform channel coding with a rate of 1/k on the information used to indicate whether downlink data transmission is correct or incorrect, to obtain a bit sequence with a length of k; perform BPSK modulation on the bit sequence with a length of k, to obtain a modulated symbol sequence with a length of k; perform spread spectrum on the modulated symbol sequence with a length of k by using the codeword, to obtain k sequences with a length of m; and respectively map the k sequences with a length of m to the k resource element groups in the resource.

The BPSK modulation can be used to improve anti-interference and anti-noise performance of the information used to indicate whether downlink data transmission is correct or incorrect, and reduce a bit error rate.

With reference to the ninth possible implementation of the sixth aspect, in a tenth possible implementation, the information used to indicate whether downlink data transmission is correct or incorrect is information obtained by performing an AND operation on a plurality of pieces of information used to indicate whether downlink data transmission is correct or incorrect.

According to a seventh aspect, an uplink control signal transmission apparatus is provided, including: a determining unit, configured to determine, based on a downlink resource, a resource used by a terminal to send an uplink control signal, where the downlink resource includes one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal; and a transmission unit, configured to transmit the uplink control signal on the resource.

The units in the apparatus provided in the seventh aspect are configured to perform the method provided in the third aspect. Therefore, for a beneficial effect of the apparatus, refer to the beneficial effect of the method provided in the third aspect. Details are not described herein again.

With reference to the seventh aspect, in a first possible implementation, the determining unit is specifically configured to: determine, based on the downlink resource, a first parameter and a second parameter that are corresponding to the resource used by the terminal to send the uplink control signal, where the first parameter corresponding to the resource is used to determine a resource group, where the resource group includes the resource, and the second parameter corresponding to the resource is used to determine the resource in the resource group; or the first parameter corresponding to the resource is used to determine a basic resource index value of the resource, and the second parameter corresponding to the resource is used to determine an offset resource index value of the resource; and determine the resource based on the first parameter and the second parameter that are corresponding to the resource.

With reference to the first possible implementation of the seventh aspect, in a second possible implementation, the determining unit is specifically configured to determine, based on a start location or an end location of the downlink resource, the first parameter and the second parameter that are corresponding to the resource used by the terminal to send the uplink control signal.

With reference to any one of the seventh aspect, or the first or the second possible implementation of the seventh aspect, in a third possible implementation, the resource includes k resource element groups, and the resource element group includes m resource elements, where k is a positive integer, and m is a positive integer.

With reference to any one of the seventh aspect, or the first to the third possible implementations of the seventh aspect, in a fourth possible implementation, the apparatus is the terminal, and the transmission unit is further configured to receive the downlink control signal and the downlink data corresponding to the downlink control signal that are sent by a base station.

With reference to the third possible implementation of the seventh aspect, in a fifth possible implementation, the uplink control signal is information used to indicate whether downlink data transmission is correct or incorrect, the apparatus is the terminal, and the apparatus further includes an execution unit, where the execution unit is configured to: determine, based on a value of m, a codeword corresponding to the resource; perform channel coding with a rate of 1/k on the information used to indicate whether downlink data transmission is correct or incorrect, to obtain a bit sequence with a length of k; perform BPSK modulation on the bit sequence with a length of k, to obtain a modulated symbol sequence with a length of k; perform spread spectrum on the modulated symbol sequence with a length of k by using the codeword, to obtain k sequences with a length of m; and respectively map the k sequences with a length of m to the k resource element groups in the resource.

The BPSK modulation can be used to improve anti-interference and anti-noise performance of the information used to indicate whether downlink data transmission is correct or incorrect, and reduce a bit error rate.

With reference to the fifth possible implementation of the seventh aspect, in a sixth possible implementation, the information used to indicate whether downlink data transmission is correct or incorrect is information obtained by performing an AND operation on a plurality of pieces of information used to indicate whether downlink data transmission is correct or incorrect.

According to an eighth aspect, an uplink control signal transmission apparatus is provided, including: a determining unit, configured to determine a resource used by a terminal to send an uplink control signal, where the resource includes k resource element groups, and the resource element group includes m resource elements, where k is a positive integer, and m is a positive integer; and a transmission unit, configured to transmit the uplink control signal on the resource.

The units in the apparatus provided in the eighth aspect are configured to perform the method provided in the fourth aspect. Therefore, for a beneficial effect of the apparatus, refer to the beneficial effect of the method provided in the fourth aspect. Details are not described herein again.

With reference to the eighth aspect, in a first possible implementation, the k resource element groups are nonconsecutive in frequency domain.

With reference to the eighth aspect or the first possible implementation of the eighth aspect, in a second possible implementation, values of k and m that are corresponding to the resource are determined based on content of the uplink control signal, and the content of the uplink control signal includes one or more of the following content: information used to indicate whether downlink data transmission is correct or incorrect, downlink channel state information, and an uplink scheduling request.

The values of k and m are determined based on the content of the uplink control signal, so as to dynamically adapt to different content of the uplink control signal. Compared with fixed values of k and m, this can avoid resource waste when a quantity of bits of the content of the uplink control signal is relatively small, and also ensure transmission reliability of the uplink control signal when the content of the uplink control signal has a relatively large quantity of bits.

With reference to the eighth aspect or the first possible implementation of the eighth aspect, in a third possible implementation, values of k and m that are corresponding to the resource are determined based on a service type of downlink data corresponding to the uplink control signal, and the service type of the downlink data corresponding to the uplink control signal includes one or more of the following service types: a mobile broadband service type, a low delay service type, a high reliability service type, and an Internet of Things service type.

The values of k and m are determined based on the service type of the downlink data corresponding to the uplink control signal, so as to better adapt to service requirements of different service types.

With reference to the eighth aspect or the first possible implementation of the eighth aspect, in a fourth possible implementation, values of k and m that are corresponding to the resource are determined based on uplink channel quality.

The values of k and m are determined based on the uplink channel quality, so as to avoid resource waste as far as possible while ensuring transmission reliability.

With reference to any one of the eighth aspect, or the first to the fourth possible implementations of the eighth aspect, in a fifth possible implementation, the determining unit is further configured to determine, based on a value of m corresponding to the resource, a codeword corresponding to the resource; and the transmission unit is specifically configured to transmit the uplink control signal on the resource by using the codeword corresponding to the resource.

The uplink control signal is transmitted by using an orthogonal code, so as to transmit a plurality of uplink control signals on a same time domain resource, frequency domain resource, and antenna port, without causing mutual interference. This helps improve a system capacity, to transmit more uplink control signals.

With reference to any one of the eighth aspect, or the first to the fourth possible implementations of the eighth aspect, in a sixth possible implementation, the determining unit is further configured to determine, based on one or more of the resource, the content of the uplink control signal, the service type of the downlink data corresponding to the uplink control signal, and control signaling of the downlink data corresponding to the uplink control signal, an antenna port corresponding to the resource; and the transmission unit is specifically configured to transmit the uplink control signal on the resource by using the antenna port corresponding to the resource.

The uplink control signal is transmitted, on the resource used by the terminal to send the uplink control signal, by using the antenna port corresponding to the resource used by the terminal to send the uplink control signal. This can further extend a system capacity, to transmit more uplink control signals.

With reference to the fifth possible implementation of the eighth aspect, in a seventh possible implementation, the determining unit is further configured to determine, based on one or more of the resource, the content of the uplink control signal, the service type of the downlink data corresponding to the uplink control signal, and control signaling of the downlink data corresponding to the uplink control signal, an antenna port corresponding to the resource; and the transmission unit is specifically configured to transmit the uplink control signal on the resource by using the codeword and the antenna port that are corresponding to the resource.

The uplink control signal is transmitted, on the resource used by the terminal to send the uplink control signal, by using the codeword and the antenna port that are corresponding to the resource used by the terminal to send the uplink control signal. This can effectively extend the system capacity, to transmit more uplink control signals.

With reference to any one of the eighth aspect, or the first to the seventh possible implementations of the eighth aspect, in an eighth possible implementation, in the resource element group, a ratio of a quantity of resource elements used to carry data to a quantity of resource elements used to carry demodulation reference signals is 2:1; or a ratio of a quantity of resource elements included in the resource element group to a quantity of resource elements that are used to carry demodulation reference signals and that are corresponding to the resource element group is 2:1.

With reference to any one of the eighth aspect, or the first to the eighth possible implementations of the eighth aspect, in a ninth possible implementation, the apparatus is a base station, and the transmission unit is further configured to send an indication message to the terminal, where the indication message is used to indicate the values/value of k and/or m that are/is corresponding to the resource.

With reference to any one of the eighth aspect, or the first to the eighth possible implementations of the eighth aspect, in a tenth possible implementation, the apparatus is the terminal; the transmission unit is further configured to receive an indication message sent by a base station; the determining unit is further configured to determine, based on the indication message, a value of a parameter corresponding to the resource used to send the uplink control signal, where the parameter includes k and/or m; and the determining unit is specifically configured to determine the resource based on the value of the parameter corresponding to the resource.

With reference to the fifth or the seventh possible implementation of the eighth aspect, in an eleventh possible implementation, the uplink control signal is information used to indicate whether downlink data transmission is correct or incorrect, the apparatus is the terminal, and the apparatus further includes an execution unit, where the execution unit is configured to: perform channel coding with a rate of 1/k on the information used to indicate whether downlink data transmission is correct or incorrect, to obtain a bit sequence with a length of k; perform BPSK modulation on the bit sequence with a length of k, to obtain a modulated symbol sequence with a length of k; perform spread spectrum on the modulated symbol sequence with a length of k by using the codeword, to obtain k sequences with a length of m; and respectively map the k sequences with a length of m to the k resource element groups.

The BPSK modulation can be used to improve anti-interference and anti-noise performance of the information used to indicate whether downlink data transmission is correct or incorrect, and reduce a bit error rate.

With reference to the eleventh possible implementation of the eighth aspect, in a twelfth possible implementation, the information used to indicate whether downlink data transmission is correct or incorrect is information obtained by performing an AND operation on a plurality of pieces of information used to indicate whether downlink data transmission is correct or incorrect.

According to a ninth aspect, a base station is provided, including a processor, a memory, a bus, and a communications interface, where the memory is configured to store a computer-executable instruction, the processor and the memory are connected by using the bus, and the processor performs, based on the computer-executable instruction stored in the memory, any resource indication method provided in the first aspect.

The components in the base station provided in the ninth aspect are configured to perform the method provided in the first aspect. Therefore, for a beneficial effect of the base station, refer to the beneficial effect of the method provided in the first aspect. Details are not described herein again.

According to a tenth aspect, a terminal is provided, including a processor, a memory, a bus, and a communications interface, where the memory is configured to store a computer-executable instruction, the processor and the memory are connected by using the bus, and the processor performs, based on the computer-executable instruction stored in the memory, any resource indication method provided in the second aspect.

The components in the terminal provided in the tenth aspect are configured to perform the method provided in the second aspect. Therefore, for a beneficial effect of the terminal, refer to the beneficial effect of the method provided in the second aspect. Details are not described herein again.

According to an eleventh aspect, an uplink control signal transmission apparatus is provided, including a processor, a memory, a bus, and a communications interface, where the memory is configured to store a computer-executable instruction, the processor and the memory are connected by using the bus, and the processor performs, based on the computer-executable instruction stored in the memory, any uplink control signal transmission method provided in the third aspect.

The components in the apparatus provided in the eleventh aspect are configured to perform the method provided in the third aspect. Therefore, for a beneficial effect of the apparatus, refer to the beneficial effect of the method provided in the third aspect. Details are not described herein again.

According to a twelfth aspect, an uplink control signal transmission apparatus is provided, including a processor, a memory, a bus, and a communications interface, where the memory is configured to store a computer-executable instruction, the processor and the memory are connected by using the bus, and the processor performs, based on the computer-executable instruction stored in the memory, any uplink control signal transmission method provided in the fourth aspect.

The components in the apparatus provided in the twelfth aspect are configured to perform the method provided in the fourth aspect. Therefore, for a beneficial effect of the apparatus, refer to the beneficial effect of the method provided in the fourth aspect. Details are not described herein again.

BRIEF DESCRIPTION OF DRAWINGS

FIG. 9 is a schematic diagram of time-frequency location distribution of PUCCH resources in a subframe in an LTE system;

FIG. 10 is a flowchart of an uplink control signal transmission method according to an embodiment of the present invention;

DESCRIPTION OF EMBODIMENTS

The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between former and latter associated objects. In descriptions of embodiments of the present invention, a "subframe/timeslot" means a subframe or a timeslot. In the following context, if a "subframe/timeslot" described in a previous part means a subframe, a "subframe/timeslot" described in a subsequent part also means a subframe; or if a "subframe/timeslot" described in a previous part means a timeslot, a "subframe/timeslot" described in a subsequent part also means a timeslot. "Plurality" in this specification means at least two.

As a new-generation 5G technology enters a discussion stage, there are currently two research directions in the 3rd Generation Partnership Project (3rd Generation Partnership Project, 3GPP for short) organization: a research direction in which backward compatibility is considered, and a research direction in which backward compatibility is not considered. The research direction in which the backward compatibility is not considered is referred to as 5G NR.

Figure 1:
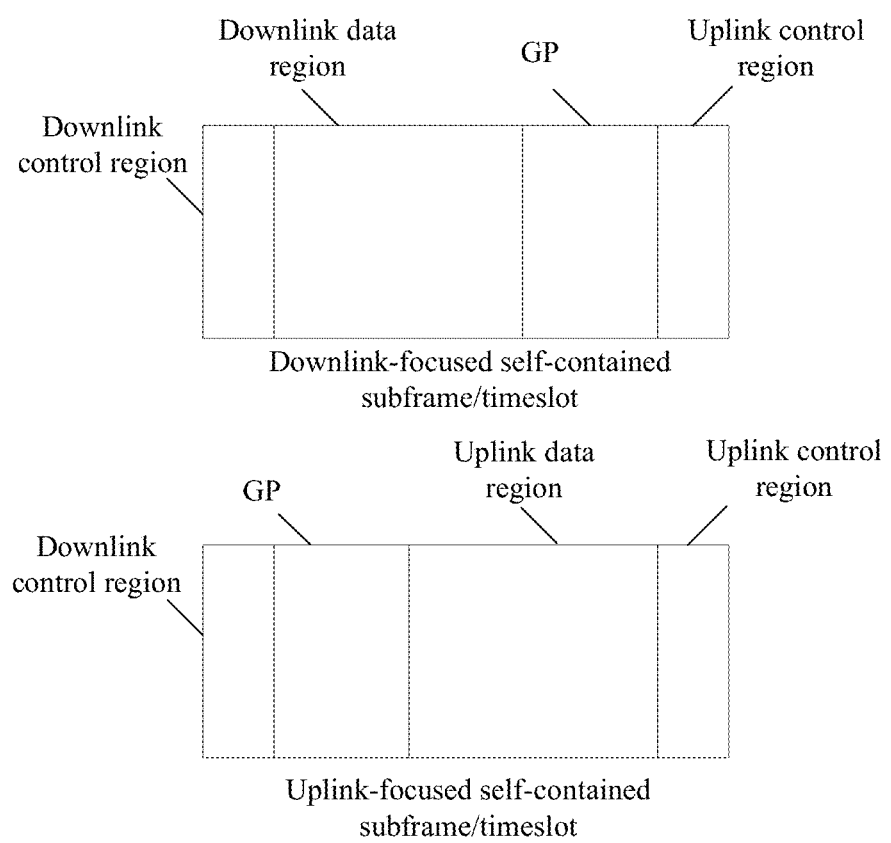
FIG. 1 is a schematic composition diagram of a new subframe/timeslot structure in 5G NR.

In a discussion process of 5G NR, a new subframe/timeslot structure is proposed. Referring to FIG. 1, the new subframe/timeslot structure includes a downlink-focused self-contained subframe/timeslot and an uplink-focused self-contained subframe/timeslot. The downlink-focused self-contained subframe/timeslot is a subframe/timeslot mainly used to transmit downlink data, and the uplink-focused self-contained subframe/timeslot is a subframe/timeslot mainly used to transmit uplink data.

The downlink-focused self-contained subframe/timeslot and the uplink-focused self-contained subframe/timeslot each include a downlink control region (Downlink control region), an uplink control region (Uplink control region), and a guard period (Guard Period, GP for short). The uplink control region may be used by a terminal to send an uplink control signal to a base station. The downlink-focused self-contained subframe/timeslot further includes a downlink data region (Downlink data region), used by the base station to transmit downlink data. The uplink-focused self-contained subframe/timeslot further includes an uplink data region (Uplink data region), used by the terminal to transmit uplink data. In some cases, the uplink control region may alternatively be occupied by the uplink data region.

Figure 2:
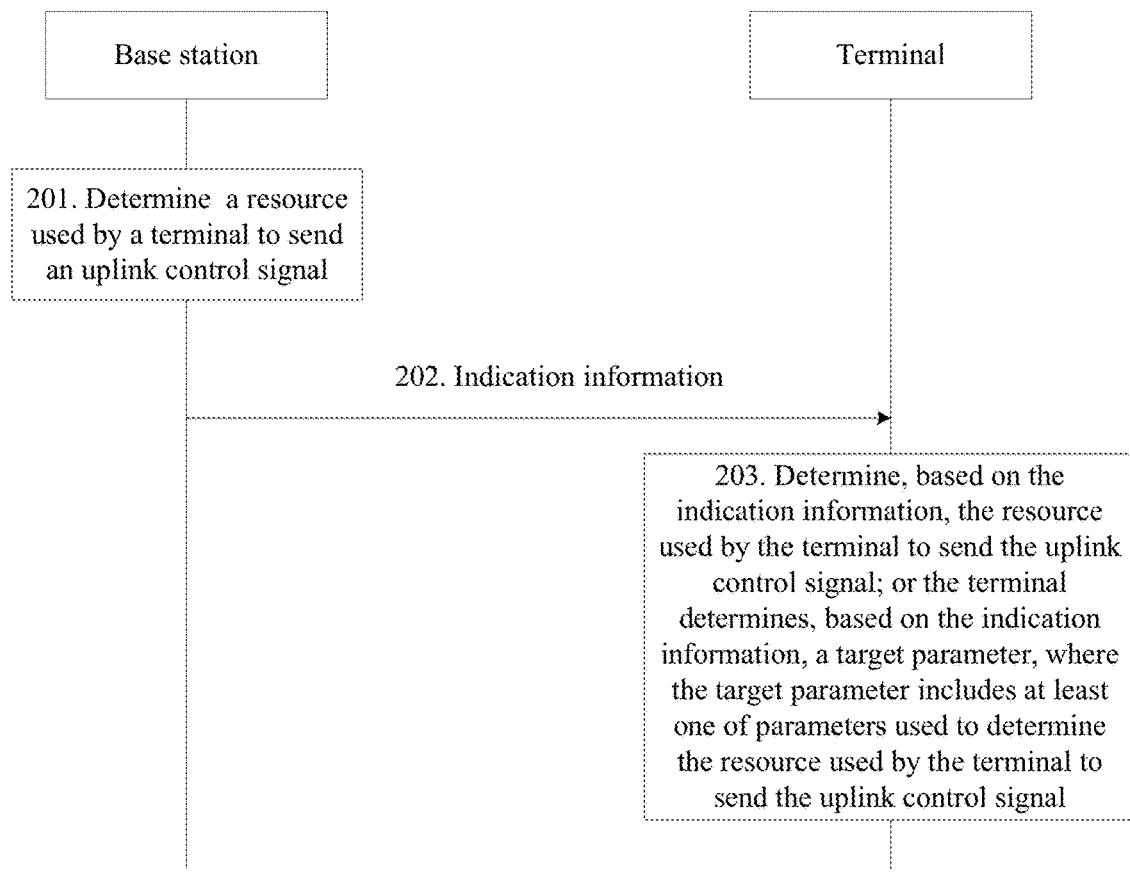
FIG. 2 is a flowchart of a resource indication method according to an embodiment of the present invention.

An embodiment of the present invention provides a resource indication method. As shown in FIG. 2, the method includes the following steps.

201. A base station determines a resource used by a terminal to send an uplink control signal.

The method provided in this embodiment of the present invention may be applied to an LTE system and a future 5G communications system, and in particular, may be applied to the future 5G communications system.

Optionally, the resource used by the terminal to send the uplink control signal includes k resource element groups, and the resource element group includes m resource elements, where k is a positive integer, and m is a positive integer.

The resource elements included in the resource element group may be resource elements in an uplink control region in a subframe/timeslot proposed in 5G NR. Resources that are determined by the base station for different terminals and that are used by the terminals to send uplink control signals may include a same quantity or different quantities of resource element groups, and the resource element groups may include a same quantity or different quantities of resource elements.

202. The base station sends indication information to the terminal.

203. The terminal receives the indication information sent by the base station, and determines, based on the indication information, the resource used by the terminal to send the uplink control signal; or the terminal determines, based on the indication information, a target parameter, where the target parameter includes at least one of parameters used to determine the resource used by the terminal to send the uplink control signal.

Optionally, in specific implementation, step 202 may include: sending, by the base station to the terminal, a radio resource control (Radio Resource Control, RRC for short) message or downlink control signaling that includes the indication information. In this case, in specific implementation of step 203, the terminal also receives the indication information by receiving the RRC message or the downlink control signaling.

Specifically, the indication information may include an index value of the resource used by the terminal to send the uplink control signal. In this case, the terminal directly determines, based on the index value, the resource used to send the uplink control signal. For example, if there are a total of 32 resources in one subframe/timeslot that are used to send uplink control signals, the 32 resources are corresponding to index values 0, 1, 2, . . . , 30, and 31, respectively. The indication information may include five bits used to indicate the index value of the resource. For example, when values of the five bits are 11111, the resource indicated by the indication information is a resource whose index value is 31; or when values of the five bits are 00000, the resource indicated by the indication information is a resource whose index value is 0.

The indication information may further include the target parameter. In this case, the terminal may determine, based on the target parameter, the resource used to send the uplink control signal.

After the terminal determines the resource used to send the uplink control signal, the terminal sends the uplink control signal to the base station on the resource. Correspondingly, the base station receives, on the resource, the uplink control signal sent by the terminal.

According to the method provided in this embodiment of the present invention, the base station may indicate, to the terminal, the resource used to send the uplink control signal, so that the terminal determines the resource used to send the uplink control signal; or the base station may indicate, to the terminal, the at least one parameter used to determine the resource, so that the terminal determines the resource based on the at least one parameter. The terminal no longer determines, by using a location of a first CCE occupied by downlink control signaling used to schedule downlink data for the terminal, the resource used to send the uplink control signal. Therefore, for downlink data sent by the base station to two terminals in different subframes/timeslots, if information used to indicate whether downlink data transmission is correct or incorrect needs to be fed back in a same subframe/timeslot, the base station may still allocate, to the two terminals, different resources for sending uplink control signals, even if locations of first CCEs occupied by downlink control signaling used to schedule the downlink data for the two terminals in different subframes/timeslots are the same. The base station indicates, to the two terminals, the resources used to send the uplink control signals, or at least one parameter used to determine the resources, so that the two terminals determine the different resources. This prevents a resource conflict while ensuring flexible resource scheduling of the base station.

Optionally, the parameters used to determine the resource that is used by the terminal to send the uplink control signal include a first parameter and a second parameter. The first parameter is used to determine a resource group, where the resource group includes the resource used by the terminal to send the uplink control signal, and the second parameter is used to determine, in the resource group, the resource used by the terminal to send the uplink control signal. Alternatively, the first parameter is used to determine a basic resource index value of the resource used by the terminal to send the uplink control signal, and the second parameter is used to determine an offset resource index value of the resource used by the terminal to send the uplink control signal.

Specifically, when the first parameter corresponding to the resource used by the terminal to send the uplink control signal is used to determine the resource group, and the second parameter corresponding to the resource used by the terminal to send the uplink control signal is used to determine, in the resource group, the resource used by the terminal to send the uplink control signal, resources in a subframe/timeslot that are used to send uplink control signals may be grouped in advance, and resources in a group are numbered. Each group is corresponding to one group number, and each intra-group resource is corresponding to one number. For example, if a total of 64 resources used to send uplink control signals are configured in the subframe/timeslot, the 64 resources used to send uplink control signals may be divided into four groups, each group includes 16 resources, and numbers of the 16 resources are 0, 1, 2, . . . , and 15. In this case, the first parameter may be used to indicate a group number, and the second parameter may be used to indicate an intra-group number. For example, if information indicated by the first parameter is 1, and information indicated by the second parameter is 15, it indicates that the resource used by the terminal to send the uplink control signal is a resource numbered 15 among resources of a group 1.

Figure 3:
FIG. 3 is a schematic diagram of a plurality of subframes/timeslots according to an embodiment of the present invention.

For example, as shown in FIG. 3, one rectangular block in FIG. 3 indicates one subframe/timeslot. If all terminals that receive downlink data in a subframe 0/timeslot 0, a subframe 1/timeslot 1, a subframe 2/timeslot 2, and a subframe 3/timeslot 3 need to feed back, in the subframe 3/timeslot 3, information used to indicate whether downlink data transmission is correct or incorrect, in a case, resources in the subframe 3/timeslot 3 that are used to send uplink control signals may be divided into four groups. Each group includes a plurality of resources. A group of resources is used by all or some of terminals that receive downlink data in a same subframe/timeslot, to feed back information used to indicate whether downlink data transmission is correct or incorrect. The base station may send a group number in each subframe/timeslot (for example, send the group number by using downlink control signaling, an RRC message, or a system message, where the system message may be a master information block (Master Information Block, MIB for short) or a system information block (System Information Block, SIB for short)), so that the terminals determine which group of resources is used by the terminals. The base station may send, to a specific terminal, downlink control signaling or an RRC message that carries an intra-group number, so that the terminal determines which resource in the group is used by the terminal.

It should be noted that, when the base station groups the resources in the subframe/timeslot that are used to send uplink control signals, quantities of resources in groups obtained through grouping may be the same or may be different. This is not specifically limited in this embodiment of the present invention. For example, when the resources in the subframe/timeslot that are used to send uplink control signals are grouped, the resources may be grouped based on a resource quantity ratio of 1:3:3:1, where resources of a group 0 are corresponding to the subframe 0/timeslot 0, resources of the group 1 are corresponding to the subframe 1/timeslot 1, resources of a group 2 are corresponding to the subframe 2/timeslot 2, and resources of a group 3 are corresponding to the subframe 3/timeslot 3. A reason for using the ratio of 1:3:3:1 is: After receiving the downlink data, the terminal rarely feeds back, after a very long time or a very short time, the information used to indicate whether downlink data transmission is correct or incorrect; therefore, a relatively small quantity of resources are allocated to such subframes/timeslots. Certainly, this is merely specific to a case in which these resources are the resources in the subframe 3/timeslot 3 that are used to send uplink control signals.

Alternatively, the first parameter may not be the group number, but is a necessary parameter that is used to group the resources and that is sent by the base station to the terminal. The base station and the terminal group the resources by using a same policy and based on the necessary parameter used to group the resources. After determining resource groups, the terminal itself determines a group of resources to which the resource used by the terminal to send the uplink control signal belongs. For example, the necessary parameter may include a quantity of groups, a grouping rule (for example, a ratio based on which the resources are grouped), and a time interval between a subframe/timeslot to which an allocated resource belongs and a subframe/timeslot in which the terminal receives the downlink data. Then the terminal may group, based on the quantity of groups and the grouping rule, resources in a subframe/timeslot in which the terminal sends the uplink control signal, to obtain a grouping result; and then determine, based on the time interval between the subframe/timeslot to which the allocated resource belongs and the subframe/timeslot in which the terminal receives the downlink data, the group number of the group of resources to which the resource used by the terminal to send the uplink control signal belongs.

When the first parameter corresponding to the resource used by the terminal to send the uplink control signal is used to determine the basic resource index value of the resource, and the second parameter is used to determine the offset resource index value of the resource, index values of resources in a subframe/timeslot that are used to send uplink control signals may be preset. For example, if a total of 64 resources used to send uplink control signals are configured in the subframe/timeslot, index values of the 64 resources may be 1, 2, . . . , 63, and 64. In this case, information indicated by the first parameter may be the basic resource index value, information indicated by the second parameter may be the offset resource index value, and a sum of the basic resource index value and the offset resource index value is an index value of the resource. For example, if the information indicated by the first parameter is 32, and the information indicated by the second parameter is 4, it indicates that the resource used by the terminal to send the uplink control signal is a resource whose index value is 36.

Based on the example shown in FIG. 3, terminals that receive downlink data in a same subframe/timeslot may use a same basic resource index value. In this case, the base station may send the basic resource index value in each subframe/timeslot (for example, send the basic resource index value by using downlink control signaling, an RRC message, or a system message, where the system message may be a MIB or a SIB), so that the terminals determine the basic resource index value used by the terminals. The base station may send, to a specific terminal, downlink control signaling or an RRC message that carries an offset resource index value. The terminal may determine a sum of the basic resource index value and the offset resource index value as the index value of the resource used by the terminal to send the uplink control signal.

Optionally, the target parameter includes the first parameter. In specific implementation, step 201 may include: determining, by the base station, the first parameter; determining, by the base station, the second parameter based on a downlink resource; and determining, by the base station based on the first parameter and the second parameter, the resource used by the terminal to send the uplink control signal.

Specifically, the downlink resource includes one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal.

Specifically, the base station may determine the first parameter in a process of scheduling resources for terminals, for example, determine a first parameter corresponding to each terminal in a process of grouping resources in one subframe/timeslot that are used to send uplink control signals.

In this case, the base station indicates the first parameter to the terminal, and the terminal itself determines a second parameter. Specifically, a method for determining the second parameter by the terminal is the same as a method for determining the second parameter by the base station, that is, the terminal determines the second parameter based on a downlink resource.

Specifically, when the downlink resource includes more types of downlink resources, the downlink resource can indicate more information.

Optionally, that the base station and the terminal determine the second parameter based on a downlink resource may specifically include: determining the second parameter based on a start location or an end location of the downlink resource.

Figure 4:
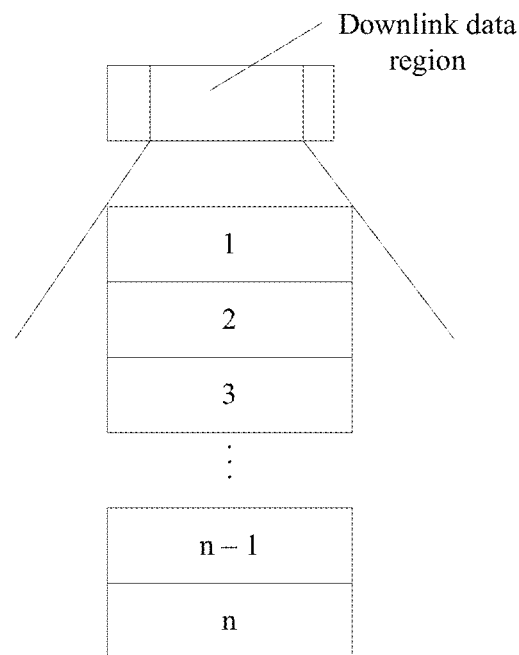
FIG. 4 is a schematic diagram of grouping frequency domain resources corresponding to a downlink data region in a subframe/timeslot according to an embodiment of the present invention.

For example, when the downlink resource includes the frequency domain resource of the downlink data corresponding to the downlink control signal, referring to FIG. 4, frequency domain resources corresponding to a downlink data region in a subframe/timeslot may be divided into n (n is an integer greater than 1) frequency domain resource groups. Each frequency domain resource group is corresponding to one intra-group resource number (or an offset resource index value). The terminal may determine an intra-group resource number (or an offset resource index value) based on a frequency domain resource group that is determined in a process of receiving the downlink data and to which a start location of the frequency domain resource on which the base station sends the downlink data belongs.

For example, when a group of resources includes 16 resources, n=16, and one frequency domain resource group is corresponding to a number of one resource in the group of resources.

Figure 5:
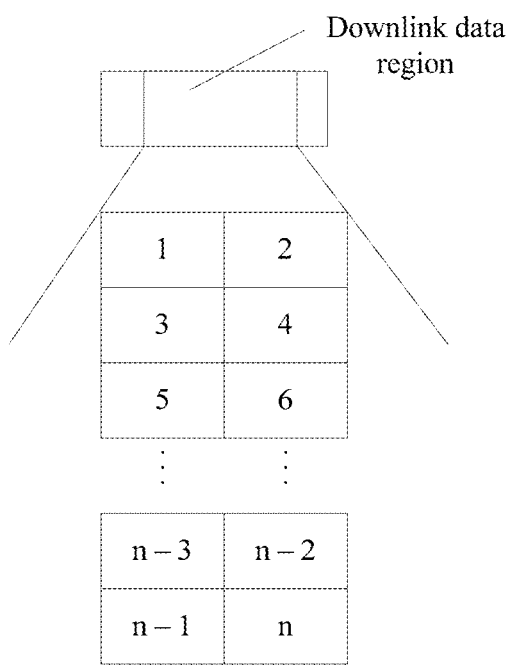
FIG. 5 is a schematic diagram of grouping time-frequency resources corresponding to a downlink data region in a subframe/timeslot according to an embodiment of the present invention.

For example, when the downlink resource includes the frequency domain resource and the time domain resource of the downlink data corresponding to the downlink control signal, referring to FIG. 5, time-frequency resources corresponding to a downlink data region in a subframe/timeslot may be divided into n time-frequency resource groups. Each time-frequency resource group is corresponding to one intra-group resource number (or an offset resource index value). The terminal may determine an intra-group resource number (or an offset resource index value) based on a time-frequency resource group that is determined in a process of receiving the downlink data and to which a start location of a time-frequency resource on which the base station sends the downlink data belongs.

Figure 6:
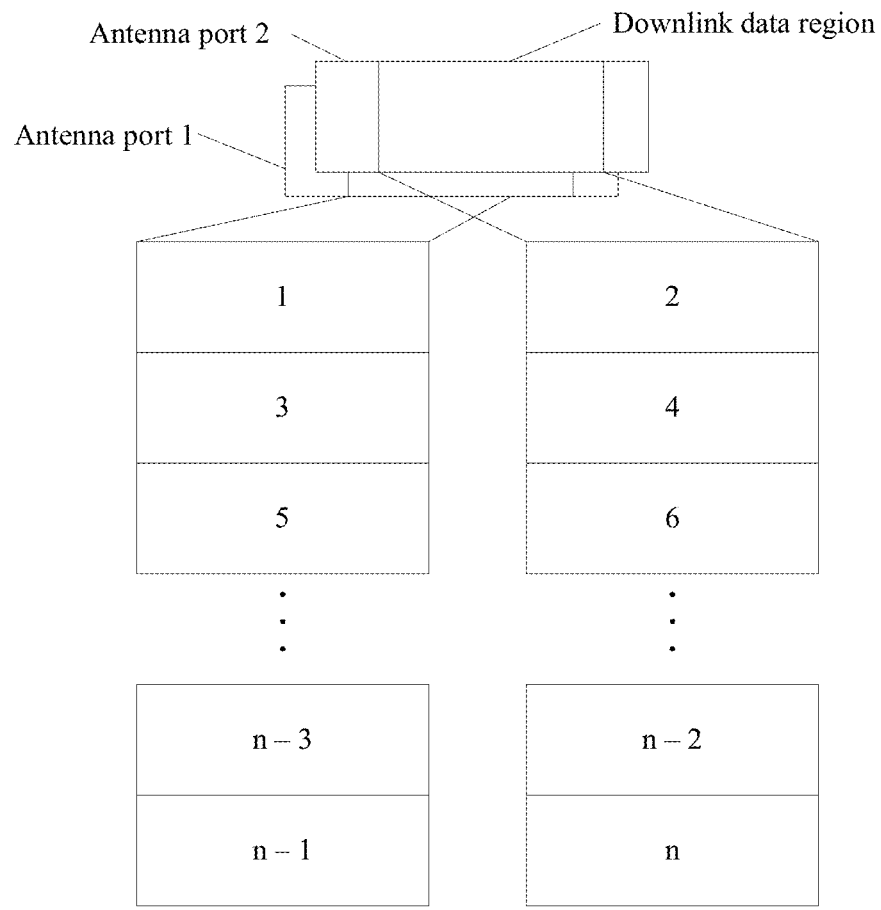
FIG. 6 is a schematic diagram of grouping frequency domain resources corresponding to a downlink data region in a subframe/timeslot that is corresponding to two antenna ports according to an embodiment of the present invention.

For example, when the downlink resource includes the frequency domain resource of the downlink data corresponding to the downlink control signal, and the antenna port number of the downlink data, referring to FIG. 6, frequency domain resources corresponding to a downlink data region in a subframe/timeslot may be divided into n/2 frequency domain resource groups. If there are two antenna ports 1 and 2, n space-frequency resource groups may be obtained with reference to the antenna port number. One space-frequency resource group is corresponding to one antenna port number and one frequency domain resource group. Each space-frequency resource group is corresponding to one intra-group resource number (or an offset resource index value). The terminal may determine an intra-group resource number (or an offset resource index value) based on the antenna port number and a start location of the frequency domain resource, where the base station sends the downlink data on the frequency domain resource and an antenna port indicated by the antenna port number, and the antenna port number and the start location are determined in a process of receiving the downlink data.

Other methods for determining the second parameter by using the downlink resource are similar to the methods in the foregoing examples, and are not described herein one by one by using examples.

After the terminal receives the target parameter and determines the second parameter, the terminal may determine, based on the target parameter and the second parameter, the resource used by the terminal to send the uplink control signal.

Optionally, the target parameter includes the second parameter. In specific implementation, step 201 may include: determining, by the base station, the first parameter based on a downlink resource; determining, by the base station, the second parameter; and determining, by the base station based on the first parameter and the second parameter, the resource used by the terminal to send the uplink control signal.

Specifically, the base station may determine the second parameter in a process of scheduling resources for terminals, for example, determine a second parameter corresponding to each terminal in a process of grouping resources in one subframe/timeslot that are used to send uplink control signals.

In this case, the base station indicates the second parameter to the terminal, and the terminal itself determines a first parameter. Specifically, a method for determining the first parameter by the terminal is the same as a method for determining the first parameter by the base station, that is, the terminal determines the first parameter based on a downlink resource.

Optionally, the method for determining the first parameter by the base station and the terminal based on the downlink resource may include: determining the first parameter based on a start location or an end location of the downlink resource.

The method for determining the first parameter by the base station and the terminal based on the downlink resource is similar to the method for determining the second parameter. Details are not described herein again.

After the terminal receives the target parameter and determines the first parameter, the terminal may determine, based on the target parameter and the first parameter, the resource used by the terminal to send the uplink control signal.

When the target parameter includes only one of the first parameter and the second parameter, the base station needs to indicate only one of the first parameter and the second parameter to the terminal. Therefore, compared with indicating both the first parameter and the second parameter to the terminal, this can reduce signaling overheads.

Optionally, if the uplink control signal is information used to indicate whether downlink data transmission is correct or incorrect, the method further includes:

determining, by the terminal based on a value of m, a codeword corresponding to the resource used by the terminal to send the uplink control signal;

performing, by the terminal, channel coding with a rate of 1/k on the information used to indicate whether downlink data transmission is correct or incorrect, to obtain a bit sequence with a length of k;

performing, by the terminal, binary phase shift keying (Binary Phase Shift Keying, BPSK for short) modulation on the bit sequence with a length of k, to obtain a modulated symbol sequence with a length of k;

performing, by the terminal, spread spectrum on the modulated symbol sequence with a length of k by using the codeword, to obtain k sequences with a length of m; and respectively mapping, by the terminal, the k sequences with a length of m to the k resource element groups in the resource used by the terminal to send the uplink control signal.

After the foregoing mapping process, the terminal may feed back, to the base station on the resource, the information used to indicate whether downlink data transmission is correct or incorrect. The BPSK modulation can be used to improve anti-interference and anti-noise performance of the information used to indicate whether downlink data transmission is correct or incorrect, and reduce a bit error rate.

Optionally, the information used to indicate whether downlink data transmission is correct or incorrect is information obtained by performing an AND operation on a plurality of pieces of information used to indicate whether downlink data transmission is correct or incorrect. One piece of information used to indicate whether downlink data transmission is correct or incorrect is indicated by using 0 or 1. The plurality of pieces of information used to indicate whether downlink data transmission is correct or incorrect may be information corresponding to downlink data that is received by the terminal on a plurality of antenna ports or in a plurality of subframes/timeslots. In this case, a data amount fed back by the terminal can be reduced.

Certainly, the information used to indicate whether downlink data transmission is correct or incorrect may alternatively be one piece of information used to indicate whether downlink data transmission is correct or incorrect.

Figure 7:
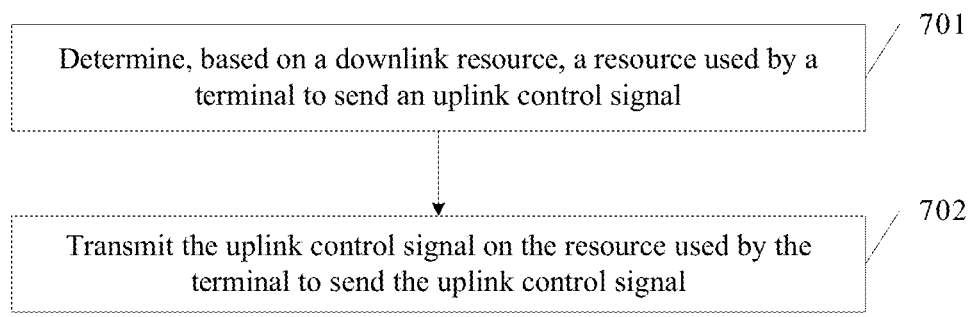
FIG. 7 is a flowchart of an uplink control signal transmission method according to an embodiment of the present invention.

An embodiment of the present invention further provides an uplink control signal transmission method. As shown in FIG. 7, the method includes the following steps.

701. Determine, based on a downlink resource, a resource used by a terminal to send an uplink control signal.

The downlink resource includes one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal.

This embodiment may be performed by a base station or the terminal. In this embodiment, the base station does not need to send, to the terminal, indication information to indicate the resource used by the terminal to send the uplink control signal, or indication information to indicate a parameter used to determine the resource of the uplink control signal. Both the base station and the terminal may determine, based on the downlink resource, the resource used by the terminal to send the uplink control signal. Therefore, the base station does not require additional signaling overheads to indicate the resource used by the terminal to send the uplink control signal.

In this embodiment of the present invention, the resource used by the terminal to send the uplink control signal may be determined by using a plurality of downlink resources. If one downlink resource can originally indicate four resources used to send uplink control signals, and another downlink resource can originally indicate eight resources used to send uplink control signals, 32 resources used to send uplink control signals can be indicated based on the one downlink resource and the another downlink resource.

Optionally, the resource includes k resource element groups, and the resource element group includes m resource elements, where k is a positive integer, and m is a positive integer. For the resource element group and values of k and m, refer to the following descriptions.

Optionally, in specific implementation, step 702 may include: determining, based on the downlink resource, a first parameter and a second parameter that are corresponding to the resource used by the terminal to send the uplink control signal; and determining, based on the first parameter and the second parameter that are corresponding to the resource used by the terminal to send the uplink control signal, the resource used by the terminal to send the uplink control signal.

The first parameter corresponding to the resource used by the terminal to send the uplink control signal is used to determine a resource group, where the resource group includes the resource used by the terminal to send the uplink control signal; and the second parameter corresponding to the resource used by the terminal to send the uplink control signal is used to determine, in the resource group, the resource used by the terminal to send the uplink control signal. Alternatively, the first parameter corresponding to the resource used by the terminal to send the uplink control signal is used to determine a basic resource index value of the resource used by the terminal to send the uplink control signal; and the second parameter corresponding to the resource used by the terminal to send the uplink control signal is used to determine an offset resource index value of the resource used by the terminal to send the uplink control signal.

In this case, a part of the downlink resource may be used to determine the first parameter, and the other part of the downlink resource may be used to determine the second parameter.

Specifically, when the first parameter corresponding to the resource used by the terminal to send the uplink control signal is used to determine the resource group, and the second parameter corresponding to the resource used by the terminal to send the uplink control signal is used to determine, in the resource group, the resource used by the terminal to send the uplink control signal, resources in a subframe/timeslot that are used to send uplink control signals may be grouped in advance, and resources in a group are numbered. Each group is corresponding to one group number, and each intra-group resource is corresponding to one number. For example, if a total of 64 resources used to send uplink control signals are configured in the subframe/timeslot, the 64 resources used to send uplink control signals may be divided into four groups, each group includes 16 resources, and numbers of the 16 resources are 0, 1, 2, . . . , and 15. In this case, the first parameter may be used to indicate a group number, and the second parameter may be used to indicate an intra-group number. For example, if information indicated by the first parameter is 1, and information indicated by the second parameter is 15, it indicates that the resource used by the terminal to send the uplink control signal is a resource numbered 15 among resources of a group 1.

When the first parameter corresponding to the resource used by the terminal to send the uplink control signal is used to determine the basic resource index value of the resource used by the terminal to send the uplink control signal, and the second parameter is used to determine the offset resource index value of the resource, index values of resources in a subframe/timeslot that are used to send uplink control signals may be preset. For example, if a total of 64 resources used to send uplink control signals are configured in the subframe/timeslot, index values of the 64 resources may be 1, 2, . . . , 63, and 64. In this case, information indicated by the first parameter may be the basic resource index value, information indicated by the second parameter may be the offset resource index value, and a sum of the basic resource index value and the offset resource index value is an index value of the resource used by the terminal to send the uplink control signal. For example, if the information indicated by the first parameter is 32, and the information indicated by the second parameter is 4, it indicates that the resource used by the terminal to send the uplink control signal is a resource whose index value is 36.

Specifically, the determining, based on the downlink resource, a first parameter and a second parameter that are corresponding to the resource used by the terminal to send the uplink control signal may specifically include: determining, based on a start location or an end location of the downlink resource, the first parameter and the second parameter that are corresponding to the resource used by the terminal to send the uplink control signal.

Specifically, for a method for determining the first parameter (or the second parameter) based on the start location or the end location of the downlink resource, refer to the example based on FIG. 4, FIG. 5, or FIG. 6. Details are not described herein again.

702. Transmit the uplink control signal on the resource used by the terminal to send the uplink control signal.

If this embodiment of the present invention is performed by the base station, in specific implementation, step 702 is: receiving, by the base station, the uplink control signal on the resource used by the terminal to send the uplink control signal. If this embodiment of the present invention is performed by the terminal, in specific implementation, step 702 is: sending, by the terminal, the uplink control signal on the resource used by the terminal to send the uplink control signal.

According to the method provided in this embodiment of the present invention, the base station and the terminal may determine, based on one or more downlink resources of the frequency domain resource of the downlink control signal corresponding to the terminal, the time domain resource of the downlink control signal, the code domain resource of the downlink control signal, the port number of the downlink control signal, the frequency domain resource of the downlink data corresponding to the downlink control signal, the time domain resource of the downlink data corresponding to the downlink control signal, the code domain resource of the downlink data corresponding to the downlink control signal, and the port number of the downlink data corresponding to the downlink control signal, the resource used by the terminal to send the uplink control signal. Therefore, for different terminals that need to feed back, in a same subframe/timeslot, information used to indicate whether downlink data transmission is correct or incorrect, the different terminals may use different downlink resources to determine resources that are used to send the information used to indicate whether downlink data transmission is correct or incorrect, thereby avoiding a resource conflict.

When this embodiment of the present invention is performed by the terminal, before step 701, the method may further include: receiving the downlink control signal and the downlink data corresponding to the downlink control signal that are sent by the base station.

The terminal may determine the downlink resource in a process of receiving the downlink control signal and the downlink data corresponding to the downlink control signal.

When this embodiment of the present invention is performed by the terminal, optionally, the uplink control signal is information used to indicate whether downlink data transmission is correct or incorrect, and the method further includes:

determining, based on a value of m, a codeword corresponding to the resource used by the terminal to send the uplink control signal;

performing channel coding with a rate of 1/k on the information used to indicate whether downlink data transmission is correct or incorrect, to obtain a bit sequence with a length of k;

performing BPSK modulation on the bit sequence with a length of k, to obtain a modulated symbol sequence with a length of k;

performing spread spectrum on the modulated symbol sequence with a length of k by using the codeword, to obtain k sequences with a length of m; and respectively mapping the k sequences with a length of m to the k resource element groups in the resource used by the terminal to send the uplink control signal.

After the foregoing mapping process, the terminal may feed back, to the base station on the resource, the information used to indicate whether downlink data transmission is correct or incorrect. The BPSK modulation can be used to improve anti-interference and anti-noise performance of the information used to indicate whether downlink data transmission is correct or incorrect, and reduce a bit error rate.

Optionally, the information used to indicate whether downlink data transmission is correct or incorrect may be information obtained by performing an AND operation on a plurality of pieces of information used to indicate whether downlink data transmission is correct or incorrect. One piece of information used to indicate whether downlink data transmission is correct or incorrect is indicated by using 0 or 1. The plurality of pieces of information used to indicate whether downlink data transmission is correct or incorrect may be information corresponding to downlink data that is received by the terminal on a plurality of antenna ports or in a plurality of subframes/timeslots. In this case, a data amount fed back by the terminal can be reduced.

Certainly, the information used to indicate whether downlink data transmission is correct or incorrect may alternatively be one piece of information used to indicate whether downlink data transmission is correct or incorrect.

Figure 8:
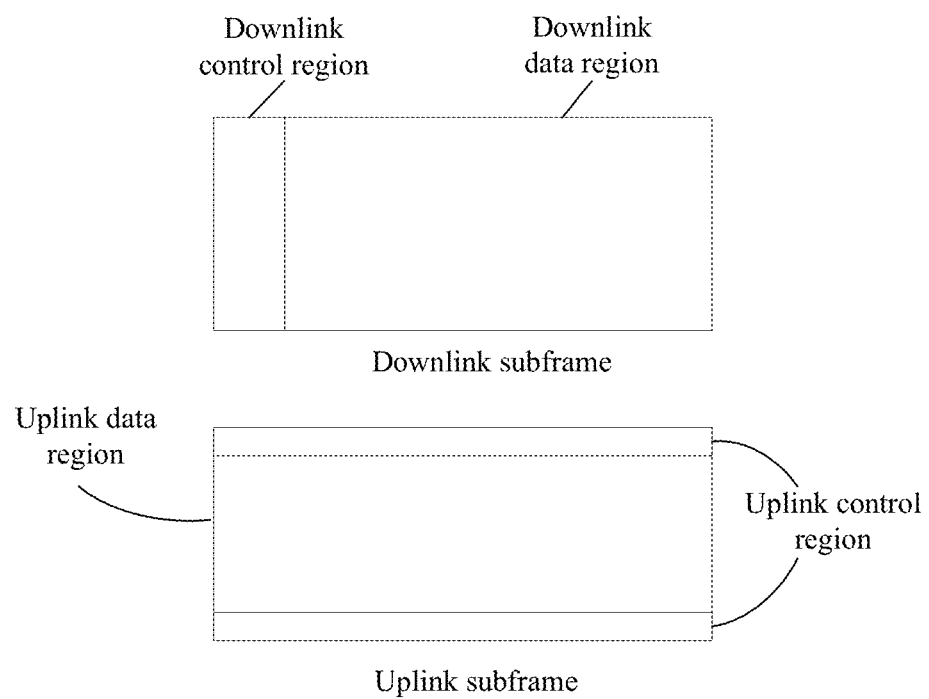
FIG. 8 is a schematic composition diagram of a subframe in an LTE system.

Currently, the LTE standard has been widely applied around the world. Subframe structures of an uplink subframe (Uplink subframe) and a downlink subframe (Downlink subframe) in an LTE system are shown in FIG. 8. Referring to FIG. 8, the downlink subframe includes a downlink control region and a downlink data region. The downlink control region is located at a beginning of the downlink subframe, occupies duration of one, two, or three orthogonal frequency division multiplexing (Orthogonal Frequency Division Multiplexing, OFDM for short) symbols, and occupies entire bandwidth.

Referring to FIG. 8, the uplink subframe includes an uplink control region and an uplink data region. The uplink control region occupies duration of the entire uplink subframe in time domain, and occupies a location of an entire bandwidth edge in frequency domain. Frequency bandwidth that is specifically occupied may be configured. In the uplink control region, UE may send, to a base station, an uplink control signal, such as ACK/NACK information for downlink data, an uplink scheduling request, and downlink channel state information. In the uplink data region, the UE may transmit uplink data to the base station.

Comparing subframe structures shown in FIG. 1 and FIG. 8, the uplink control region in the subframe/timeslot structure in 5G NR and the uplink control region in the subframe structure in the LTE system occupy completely different time-frequency resources. In 5G NR, the uplink control region occupies one or two OFDM symbols at an end of a subframe/timeslot in time domain, and occupies entire bandwidth in frequency domain. In the LTE system, the uplink control region occupies duration of one subframe in time domain, and occupies upper edge bandwidth and lower edge bandwidth of entire bandwidth in frequency domain.

Time-frequency location distribution of PUCCH resources that is defined in the LTE system is shown in FIG. 9. One uplink subframe includes a timeslot (slot) 0 and a timeslot 1. One PUCCH resource occupies duration of one uplink subframe in time domain, and occupies a width of one physical resource block (Physical Resource Block, PRB for short) in frequency domain. In addition, one PUCCH resource is subject to frequency hopping between two timeslots. Referring to FIG. 9, time-frequency resources with a same value of m constitute one PUCCH resource.

It can be learned that, in the LTE system, a quantity of time-frequency resources occupied by one PUCCH resource is fixed. However, with development of Internet of Things technologies, a quantity of terminals in a network inevitably increases greatly. Therefore, in 5G resources in an uplink control region need to be capable of serving more terminals. Obviously, the method for configuring PUCCH resources in the LTE system cannot meet this requirement. Based on this, an embodiment of the present invention provides an uplink control signal transmission method, including a method for determining a resource used to transmit an uplink control signal.

An embodiment of the present invention provides an uplink control signal transmission method. As shown in FIG. 10, the method includes the following steps.

1001. Determine a resource used by a terminal to send an uplink control signal, where the resource used by the terminal to send the uplink control signal includes k resource element groups, and the resource element group includes m resource elements, where k is a positive integer, and m is a positive integer.

The uplink control signal may be information used to indicate whether downlink data transmission is correct or incorrect, downlink channel state information, an uplink scheduling request, or the like.

The resource, used by the terminal to send the uplink control signal, determined in step 1001 may be one or more resources used by the terminal to send the uplink control signal. In this embodiment of the present invention, the technical solution provided in this embodiment of the present invention is described by using an example in which the resource, used by the terminal to send the uplink control signal, determined in step 1001 is one resource used by the terminal to send the uplink control signal.

It should be noted that resources used by different terminals to send uplink control signals (or a plurality of resources used by one terminal to send an uplink control signal) may include a same quantity or different quantities (namely, k) of resource element groups, and the resource element groups may include a same quantity or different quantities (namely, m) of resource elements.

The resource element group may include only resource elements used to carry data. In this case, there are corresponding resource elements used to carry demodulation reference signals in a resource element group. Demodulation reference signals carried in these resource elements used to carry demodulation reference signals are used to demodulate data carried in resource elements in the resource element group that are used to carry data. For example, a ratio of a quantity of resource elements included in the resource element group to a quantity of resource elements that are used to carry demodulation reference signals and that are corresponding to the resource element group may be 2:1.

Alternatively, the resource element group may include both resource elements used to carry data and resource elements used to carry demodulation reference signals. In this case, demodulation reference signals carried in resource elements in a resource element group that are used to carry demodulation reference signals are used to demodulate data carried in resource elements in the resource element group that are used to carry data. For example, in the resource element group, a ratio of a quantity of resource elements used to carry data to a quantity of resource elements used to carry demodulation reference signals may be 2:1.

Specifically, in this embodiment of the present invention, a resource element may be an RE (Resource Element).

Figure 11:
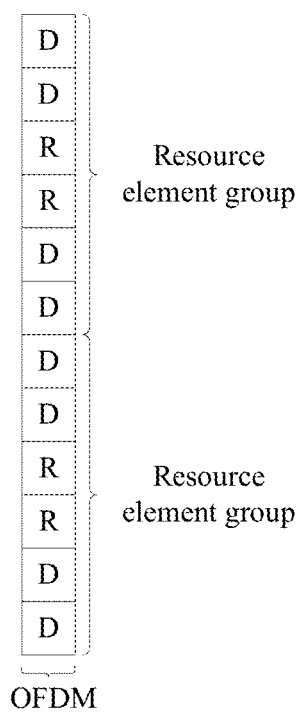
FIG. 11 to FIG. 14 each are a schematic composition diagram of a resource element group according to an embodiment of the present invention.
Figure 12:
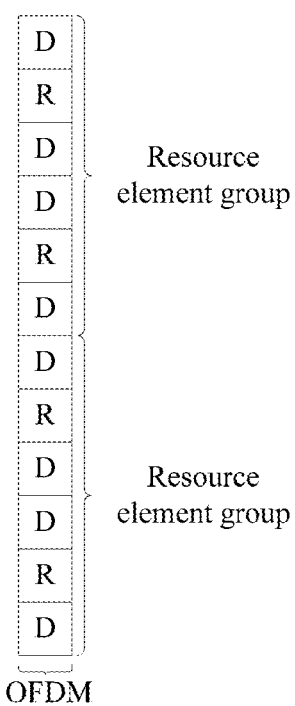

For example, a resource element is an RE, and m=6. For a location relationship between REs carrying data and REs carrying demodulation reference signals in entire bandwidth, refer to FIG. 11 or FIG. 12. In FIG. 11 and FIG. 12, one square block indicates one RE. R in a square block indicates that the RE is used to carry a demodulation reference signal, and D in a square block indicates that the RE is used to carry data. In this case, one resource element group may include two REs used to carry demodulation reference signals and four REs used to carry data.

In this embodiment of the present invention, for ease of providing an example, when a resource element group includes both resource elements used to carry data and resource elements used to carry demodulation reference signals, an example in which m resource elements in the resource element group are m consecutive resource elements is used. Actually, the m resource elements in the resource element group may be constituted by m resource elements scattered at different locations in entire bandwidth.

Figure 13:
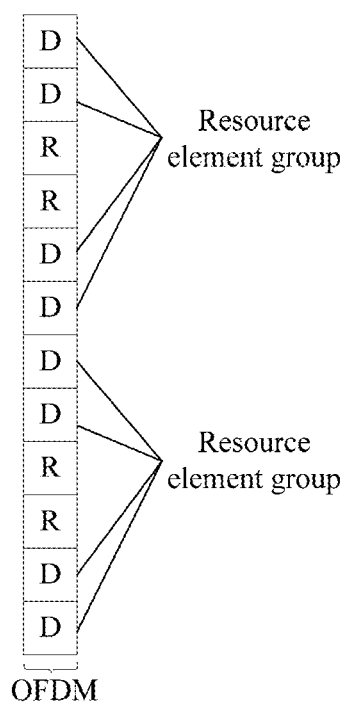
Figure 14:
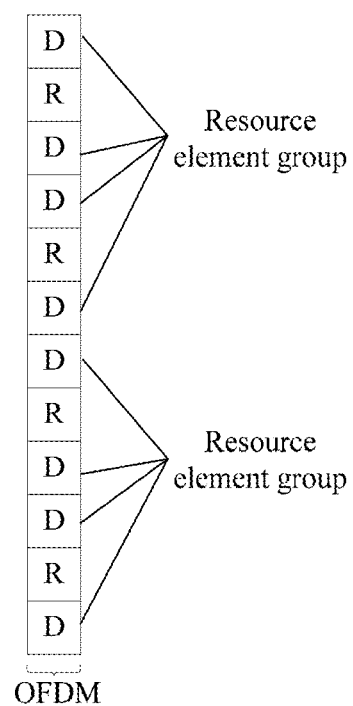

For example, a resource element is an RE, and m=4. For a location relationship between REs carrying data and REs carrying demodulation reference signals in the entire bandwidth, refer to FIG. 13 or FIG. 14. In this case, one resource element group may include four REs used to carry data. The four REs used to carry data may be constituted by m consecutive REs among all REs in the entire bandwidth that are used to carry data.

In this embodiment of the present invention, for ease of providing an example, when a resource element group includes only resource elements used to carry data, an example in which m resource elements in the resource element group are m consecutive resource elements among all resource elements used to carry data is used. Actually, the m resource elements in the resource element group may be constituted by m resource elements scattered at different locations in all the resource elements used to carry data.

It should be noted that, in this embodiment of the present invention, the location relationship, shown in FIG. 11 to FIG. 14, between the resource elements carrying data and the resource elements carrying demodulation reference signals is merely an example for description, and should not be construed as a limitation on the present invention.

Specifically, in specific implementation of step 1001, values of k and m may be first determined. Each group of values of k and m may be corresponding to a configuration policy. The configuration policy may be used to determine location distribution of k resource element groups in frequency domain.

1002. Transmit the uplink control signal on the resource used by the terminal to send the uplink control signal.

This embodiment of the present invention may be performed by a base station or the terminal. If this embodiment of the present invention is performed by the base station, in specific implementation, step 1002 is: receiving, by the base station, the uplink control signal on the resource used by the terminal to send the uplink control signal. If this embodiment of the present invention is performed by the terminal, in specific implementation, step 1002 is: sending, by the terminal, the uplink control signal on the resource used by the terminal to send the uplink control signal.

According to the method provided in this embodiment of the present invention, resources that are used by different terminals to send uplink control signals and that are determined by the base station may include a same quantity or different quantities of resource element groups, and the resource element groups may include a same quantity or different quantities of resources. Compared with that in the prior art, resource scheduling is more flexible. In addition, when total resources included in an uplink control region remain unchanged, the base station may allocate, to more terminals, a resource used to send an uplink control signal, so as to more easily meet a requirement of a 5G communications system.

Optionally, the k resource element groups are nonconsecutive in frequency domain. According to this optional method, a network system can obtain a frequency diversity gain, so as to improve transmission reliability.

Figure 15:
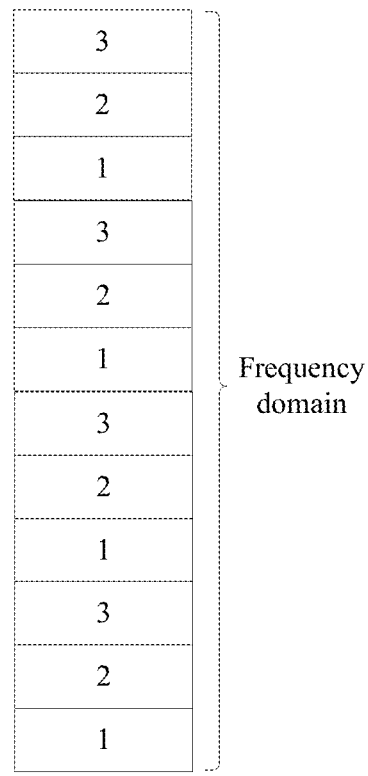
FIG. 15 is a schematic distribution diagram of a resource element group in frequency domain according to an embodiment of the present invention.

Preferably, the k resource element groups are evenly distributed in the entire bandwidth. For example, as shown in FIG. 15, one rectangular block in FIG. 15 indicates one resource element group. If k=4, all resource element groups numbered i may be one resource, where i is 1, 2, or 3.

Specifically, a value of a quantity k of resource element groups included in one resource, and a value of a quantity m of resource elements included in a resource element group may be determined in any one of the following manner 1 to manner 3.

Manner 1: Determine the values based on content of the uplink control signal.

The content of the uplink control signal includes one or more of the following content: information used to indicate whether downlink data transmission is correct or incorrect, downlink channel state information, and an uplink scheduling request.

Specifically, the value of k may be determined based on a quantity of bits of the content of the uplink control signal. The value of k increases as the quantity of bits of the content of the uplink control signal increases. For example, when the content of the uplink control signal is the information used to indicate whether downlink data transmission is correct or incorrect, if the quantity of bits of the content of the uplink control signal is 1, it may be determined that k is 1; or when the content of the uplink control signal is the downlink channel state information, if a quantity of bits of the downlink channel state information is 20, it may be determined that k is 3.

When the content of the uplink control signal includes a plurality of types of content among the information used to indicate whether downlink data transmission is correct or incorrect, the downlink channel state information, and the uplink scheduling request, the value of k may be determined based on a quantity of types of content included in the content of the uplink control signal. For example, if the content of the uplink control signal includes two types of content, it may be determined that k is 4.

In addition, the value of m may be determined based on the content of the uplink control signal. For example, when the content of the uplink control signal is the information used to indicate whether downlink data transmission is correct or incorrect, it may be determined that m is 4; or when the content of the uplink control signal is the downlink channel state information, it may be determined that m is 8.

Specifically, values of k and m that are corresponding to different content of the uplink control signal may be preset in the base station.

The values of k and m are determined based on the content of the uplink control signal, so as to dynamically adapt to different content of the uplink control signal. Compared with fixed values of k and m, this can avoid resource waste when the quantity of bits of the content of the uplink control signal is relatively small, and also ensure transmission reliability of the uplink control signal when the content of the uplink control signal has a relatively large quantity of bits.

Manner 2: Determine the values based on a service type of downlink data corresponding to the uplink control signal.

The service type of the downlink data corresponding to the uplink control signal includes one or more of the following service types: a mobile broadband service type, a low delay service type, a high reliability service type, and an Internet of Things service type.

Specifically, the values of k and m may be determined based on a service requirement of the service type of the downlink data corresponding to the uplink control signal. For example, when the service type of the downlink data corresponding to the uplink control signal is a high reliability service, a determined value of k may be relatively large, for example, k=4; and a determined value of m may be relatively small, for example, m=4.

When the service type of the downlink data corresponding to the uplink control signal is an Internet of Things service, a determined value of k may be relatively small, for example, k=1; and a determined value of m may be relatively large, for example, m=8.

The values of k and m are determined based on the service type of the downlink data corresponding to the uplink control signal, so as to better adapt to service requirements of different service types.

Manner 3: Determine the values based on uplink channel quality.

Specifically, when uplink control channel quality is improved, a determined value of k may decrease, and a determined value of m may increase. When uplink control channel quality deteriorates, to ensure correct transmission of the uplink control signal, a determined value of k may increase, and a determined value of m may decrease.

The values of k and m are determined based on the uplink channel quality, so as to avoid resource waste as far as possible while ensuring transmission reliability.

Optionally, before step 1002, the method may further include: determining, based on a value of m corresponding to the resource used by the terminal to send the uplink control signal, a codeword corresponding to the resource used by the terminal to send the uplink control signal. In this case, step 1002 may include: transmitting the uplink control signal, on the resource used by the terminal to send the uplink control signal, by using the codeword corresponding to the resource used by the terminal to send the uplink control signal.

Specifically, a codeword length is equal to the value of m. A codeword group may be determined based on the value of m. Any two codewords in the codeword group are orthogonal codes, and a length of any codeword in the codeword group is the same as the value of m. One codeword is selected from the codeword group as the codeword corresponding to the resource used by the terminal to send the uplink control signal.

For example, when m=4, a codeword group is determined based on the value of m, a length of a codeword in the determined codeword group is 4, and one codeword is selected from the determined codeword group as the codeword corresponding to the resource used by the terminal to send the uplink control signal.

In this case, one resource element group may be multiplexed by using m/x codewords, where x is a quantity of resource elements that are used to carry demodulation reference signals for demodulating data carried in the resource element group. For example, when m=4 and x=2, a codeword group corresponding to two resource elements used to carry demodulation reference signals may include [+1 +1] and [+1 −1], and a codeword group corresponding to the resource element group may include [+1 +1 +1 +1] and [+1 −1 +1 −1].

The uplink control signal is transmitted by using an orthogonal code, so as to transmit a plurality of uplink control signals on a same time domain resource, frequency domain resource, and antenna port, without causing mutual interference. This helps improve a system capacity, to transmit more uplink control signals.

Optionally, before the transmitting the uplink control signal, on the resource used by the terminal to send the uplink control signal, by using the codeword corresponding to the resource used by the terminal to send the uplink control signal, the method may further include:

determining, based on one or more of the resource used by the terminal to send the uplink control signal, the content of the uplink control signal, the service type of the downlink data corresponding to the uplink control signal, and control signaling of the downlink data corresponding to the uplink control signal, an antenna port corresponding to the resource used by the terminal to send the uplink control signal; and the transmitting the uplink control signal, on the resource used by the terminal to send the uplink control signal, by using the codeword corresponding to the resource used by the terminal to send the uplink control signal includes: transmitting the uplink control signal, on the resource used by the terminal to send the uplink control signal, by using the codeword and the antenna port that are corresponding to the resource used by the terminal to send the uplink control signal.

For example, the antenna port corresponding to the resource used by the terminal to send the uplink control signal may be determined based on the content of the uplink control signal to be sent by the terminal. For example, when the uplink control signal is the information used to indicate whether downlink data transmission is correct or incorrect, the antenna port corresponding to the resource used by the terminal to send the uplink control signal may be an antenna port 0; when the uplink control signal is the downlink channel state information, the antenna port corresponding to the resource used by the terminal to send the uplink control signal may be an antenna port 1; or when the uplink control signal is the uplink scheduling request, the antenna port corresponding to the resource used by the terminal to send the uplink control signal may be an antenna port 2.

The descriptions herein are merely examples. In specific implementation, there may be a preset correspondence between the antenna port and one or more of the following information: the resource used by the terminal to send the uplink control signal, the content of the uplink control signal, the service type of the downlink data corresponding to the uplink control signal, and the control signaling of the downlink data corresponding to the uplink control signal. The base station and the terminal may determine, based on the preset correspondence, the antenna port corresponding to the resource used by the terminal to send the uplink control signal.

The uplink control signal is transmitted, on the resource used by the terminal to send the uplink control signal, by using the codeword and the antenna port that are corresponding to the resource used by the terminal to send the uplink control signal. This can effectively extend the system capacity, to transmit more uplink control signals.

Optionally, before step 1002, the method may further include: determining, based on one or more of the resource used by the terminal to send the uplink control signal, the content of the uplink control signal, the service type of the downlink data corresponding to the uplink control signal, and control signaling of the downlink data corresponding to the uplink control signal, an antenna port corresponding to the resource used by the terminal to send the uplink control signal. In this case, step 1002 includes: transmitting the uplink control signal, on the resource used by the terminal to send the uplink control signal, by using the antenna port corresponding to the resource used by the terminal to send the uplink control signal.

The uplink control signal is transmitted, on the resource used by the terminal to send the uplink control signal, by using the antenna port corresponding to the resource used by the terminal to send the uplink control signal. This can further extend a system capacity, to transmit more uplink control signals.

When this embodiment of the present invention is performed by the base station, optionally, the method may further include: sending, by the base station, an indication message to the terminal, where the indication message is used to indicate the values/value of k and/or m that are/is corresponding to the resource used by the terminal to send the uplink control signal.

The indication message sent by the base station to the terminal is used by the terminal to determine the resource used by the terminal to send the uplink control signal.

When this embodiment of the present invention is performed by the terminal, optionally, before step 1001, the method may further include: receiving, by the terminal, the indication message sent by the base station; and determining, by the terminal based on the indication message, a value of a parameter corresponding to the resource used to send the uplink control signal, where the parameter includes k and/or m. In this case, step 1001 may specifically include: determining, based on the value of the parameter corresponding to the resource used by the terminal to send the uplink control signal, the resource used by the terminal to send the uplink control signal.

In an implementation, a table of a correspondence between k and m may be maintained in the terminal. When the indication message includes the value of only k (or m), the terminal may determine the value of m (or k) based on the value of k (or m) and the maintained table of a correspondence between k and m; and then determine, based on the values of k and m, the resource used by the terminal to send the uplink control signal.

In another implementation, an operation rule may be stored in the terminal. According to the operation rule, the value of m (or k) may be determined when the value of k (or m) is known. When the indication message includes the value of only k (or m), the terminal may obtain the value of m (or k) through calculation according to the operation rule; and then determine, based on the values of k and m, the resource used by the terminal to send the uplink control signal.

When this embodiment of the present invention is performed by the terminal, optionally, if the uplink control signal is the information used to indicate whether downlink data transmission is correct or incorrect, the method may further include:

performing, by the terminal, channel coding with a rate of 1/k on the information used to indicate whether downlink data transmission is correct or incorrect, to obtain a bit sequence with a length of k;

performing, by the terminal, BPSK modulation on the bit sequence with a length of k, to obtain a modulated symbol sequence with a length of k;

performing, by the terminal, spread spectrum on the modulated symbol sequence with a length of k by using the codeword, to obtain k sequences with a length of m; and respectively mapping, by the terminal, the k sequences with a length of m to the k resource element groups.

After the foregoing mapping process, the terminal may feed back, to the base station on the resource, the information used to indicate whether downlink data transmission is correct or incorrect.

After the foregoing mapping process, the terminal may feed back, to the base station on the resource, the information used to indicate whether downlink data transmission is correct or incorrect. The BPSK modulation can be used to improve anti-interference and anti-noise performance of the information used to indicate whether downlink data transmission is correct or incorrect, and reduce a bit error rate.

Optionally, the information used to indicate whether downlink data transmission is correct or incorrect may be information obtained by performing an AND operation on a plurality of pieces of information used to indicate whether downlink data transmission is correct or incorrect. One piece of information used to indicate whether downlink data transmission is correct or incorrect is indicated by using 0 or 1. The plurality of pieces of information used to indicate whether downlink data transmission is correct or incorrect may be information corresponding to downlink data that is received by the terminal on a plurality of antenna ports or in a plurality of subframes/timeslots. In this case, a data amount fed back by the terminal can be reduced.

Certainly, the information used to indicate whether downlink data transmission is correct or incorrect may alternatively be one piece of information used to indicate whether downlink data transmission is correct or incorrect.

The foregoing describes the solutions provided in the embodiments of the present invention mainly from a perspective of a method. It may be understood that, to implement the foregoing functions, the base station or the terminal in the method embodiments of the present invention includes corresponding hardware structures and/or software modules for executing the functions. A person of ordinary skill in the art should easily be aware that units and algorithm steps in the examples described with reference to the embodiments disclosed in this specification may be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that such an implementation goes beyond the scope of the present invention.

In the embodiments of the present invention, functional units of the base station or the terminal may be divided according to the foregoing method embodiments. For example, the functional units may be divided according to the functions, or at least two functions may be integrated in one processing module. The integrated module may be implemented in a form of hardware, or may be implemented in a form of a software function module. It should be noted that the unit division in the embodiments of the present invention is an example, is merely logical function division, and may be other division in actual implementation.

When the integrated unit is used, the following describes a possible schematic structural diagram of the base station or the terminal in the foregoing method embodiments.

Figure 16:
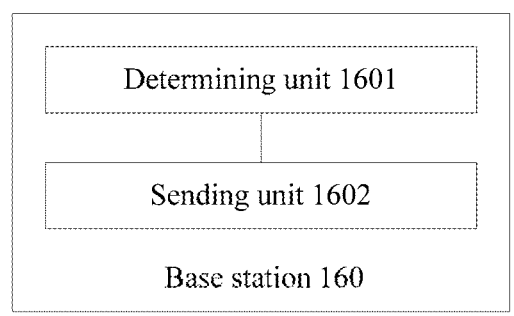
FIG. 16 is a schematic composition diagram of a base station according to an embodiment of the present invention.

An embodiment of the present invention further provides a base station 160. As shown in FIG. 16, the base station 160 includes:

a determining unit 1601, configured to determine a resource used by a terminal to send an uplink control signal; and a sending unit 1602, configured to send indication information to the terminal, where the indication information is used to indicate the resource; or the indication information is used to indicate a target parameter, and the target parameter includes at least one of parameters used by the terminal to determine the resource.

Optionally, the parameters used to determine the resource include a first parameter and a second parameter. The first parameter is used to determine a resource group, where the resource group includes the resource, and the second parameter is used to determine the resource in the resource group. Alternatively, the first parameter is used to determine a basic resource index value of the resource, and the second parameter is used to determine an offset resource index value of the resource.

Optionally, the target parameter includes the first parameter, and the determining unit 1601 is specifically configured to: determine the first parameter; determine the second parameter based on a downlink resource, where the downlink resource includes one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal; and determine, based on the first parameter and the second parameter, the resource used by the terminal to send the uplink control signal.

Optionally, the determining unit 1601 is specifically configured to determine the second parameter based on a start location or an end location of the downlink resource.

Optionally, the target parameter includes the second parameter, and the determining unit 1601 is specifically configured to:

determine the first parameter based on a downlink resource, where the downlink resource includes one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal; determine the second parameter; and determine, based on the first parameter and the second parameter, the resource used by the terminal to send the uplink control signal.

Optionally, the determining unit 1601 is specifically configured to determine the first parameter based on a start location or an end location of the downlink resource.

Optionally, the sending unit 1602 is specifically configured to send, to the terminal, an RRC message or downlink control signaling that includes the indication information.

Optionally, the resource includes k resource element groups, and the resource element group includes m resource elements, where k is a positive integer, and m is a positive integer.

The units in the base station 160 provided in this embodiment of the present invention are configured to perform the method shown in FIG. 2. Therefore, for a beneficial effect of the base station 160, refer to the beneficial effect of the method based on FIG. 2. Details are not described herein again.

Figure 17:
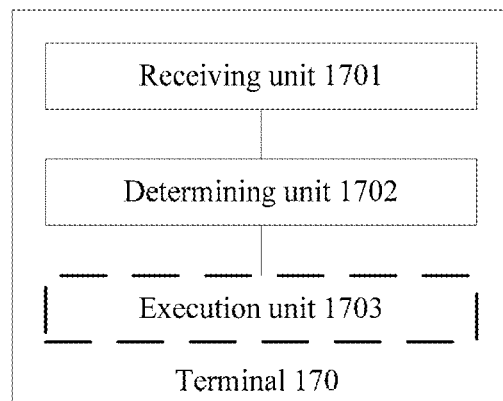
FIG. 17 is a schematic composition diagram of a terminal according to an embodiment of the present invention.

An embodiment of the present invention further provides a terminal 170. As shown in FIG. 17, the terminal 170 includes:

a receiving unit 1701, configured to receive indication information sent by a base station; and a determining unit 1702, configured to: determine, based on the indication information, a resource used by the terminal to send an uplink control signal; or determine, based on the indication information, a target parameter, where the target parameter includes at least one of parameters used to determine the resource.

Optionally, the parameters used to determine the resource include a first parameter and a second parameter. The first parameter is used to determine a resource group, where the resource group includes the resource, and the second parameter is used to determine the resource in the resource group. Alternatively, the first parameter is used to determine a basic resource index value of the resource, and the second parameter is used to determine an offset resource index value of the resource.

Optionally, the target parameter includes the first parameter, and the determining unit 1702 is further configured to:

determine the second parameter based on a downlink resource, where the downlink resource includes one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal.

Optionally, the determining unit 1702 is specifically configured to determine the second parameter based on a start location or an end location of the downlink resource.

Optionally, the target parameter includes the second parameter, and the determining unit 1702 is further configured to:

determine the first parameter based on a downlink resource, where the downlink resource includes one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal.

Optionally, the determining unit 1702 is specifically configured to determine the first parameter based on a start location or an end location of the downlink resource.

Optionally, the determining unit 1702 is further configured to determine the resource based on the target parameter and the second parameter.

Optionally, the determining unit 1702 is further configured to determine the resource based on the target parameter and the first parameter.

Optionally, the resource includes k resource element groups, and the resource element group includes m resource elements, where k is a positive integer, and m is a positive integer.

Optionally, the uplink control signal is information used to indicate whether downlink data transmission is correct or incorrect. As shown in FIG. 17, the terminal further includes an execution unit 1703. The execution unit 1703 is configured to: determine, based on a value of m, a codeword corresponding to the resource; perform channel coding with a rate of 1/k on the information used to indicate whether downlink data transmission is correct or incorrect, to obtain a bit sequence with a length of k; perform BPSK modulation on the bit sequence with a length of k, to obtain a modulated symbol sequence with a length of k; perform spread spectrum on the modulated symbol sequence with a length of k by using the codeword, to obtain k sequences with a length of m; and respectively map the k sequences with a length of m to the k resource element groups in the resource.

Optionally, the information used to indicate whether downlink data transmission is correct or incorrect is information obtained by performing an AND operation on a plurality of pieces of information used to indicate whether downlink data transmission is correct or incorrect.

The units in the terminal 170 provided in this embodiment of the present invention are configured to perform the method shown in FIG. 2. Therefore, for a beneficial effect of the terminal 170, refer to the beneficial effect of the method based on FIG. 2. Details are not described herein again.

Figure 18:
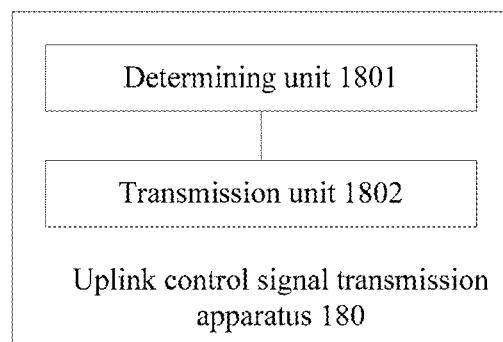
FIG. 18 to FIG. 21 each are a schematic composition diagram of an uplink control signal transmission apparatus according to an embodiment of the present invention.
Figure 19:
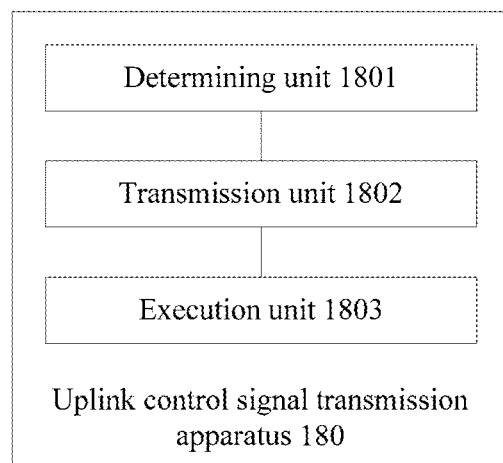

An embodiment of the present invention further provides an uplink control signal transmission apparatus 180. The apparatus 180 may be a base station or a terminal. As shown in FIG. 18 or FIG. 19, the apparatus 180 includes:

a determining unit 1801, configured to determine, based on a downlink resource, a resource used by a terminal to send an uplink control signal, where the downlink resource includes one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal; and a transmission unit 1802, configured to transmit the uplink control signal on the resource.

Optionally, the determining unit 1801 is specifically configured to: determine, based on the downlink resource, a first parameter and a second parameter that are corresponding to the resource used by the terminal to send the uplink control signal, where the first parameter corresponding to the resource is used to determine a resource group, where the resource group includes the resource, and the second parameter corresponding to the resource is used to determine the resource in the resource group; or the first parameter corresponding to the resource is used to determine a basic resource index value of the resource, and the second parameter corresponding to the resource is used to determine an offset resource index value of the resource; and determine the resource based on the first parameter and the second parameter that are corresponding to the resource.

Optionally, the determining unit 1801 is specifically configured to determine, based on a start location or an end location of the downlink resource, the first parameter and the second parameter that are corresponding to the resource used by the terminal to send the uplink control signal.

Optionally, the resource includes k resource element groups, and the resource element group includes m resource elements, where k is a positive integer, and m is a positive integer.

Optionally, the apparatus 180 is the terminal, and the transmission unit 1802 is further configured to receive a downlink control signal and downlink data corresponding to the downlink control signal that are sent by a base station.

Optionally, the uplink control signal is information used to indicate whether downlink data transmission is correct or incorrect, and the apparatus 180 is the terminal. As shown in FIG. 19, the apparatus 180 further includes an execution unit 1803. The execution unit 1803 is configured to: determine, based on a value of m, a codeword corresponding to the resource; perform channel coding with a rate of 1/k on the information used to indicate whether downlink data transmission is correct or incorrect, to obtain a bit sequence with a length of k; perform BPSK modulation on the bit sequence with a length of k, to obtain a modulated symbol sequence with a length of k; perform spread spectrum on the modulated symbol sequence with a length of k by using the codeword, to obtain k sequences with a length of m; and respectively map the k sequences with a length of m to the k resource element groups in the resource.

Optionally, the information used to indicate whether downlink data transmission is correct or incorrect is information obtained by performing an AND operation on a plurality of pieces of information used to indicate whether downlink data transmission is correct or incorrect.

The units in the apparatus 180 provided in this embodiment of the present invention are configured to perform the method shown in FIG. 7. Therefore, for a beneficial effect of the apparatus 180, refer to the beneficial effect of the method based on FIG. 7. Details are not described herein again.

Figure 20:
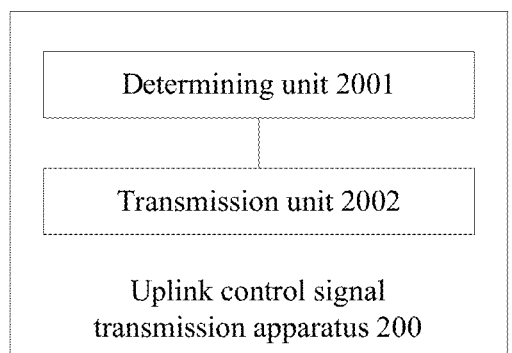
Figure 21:
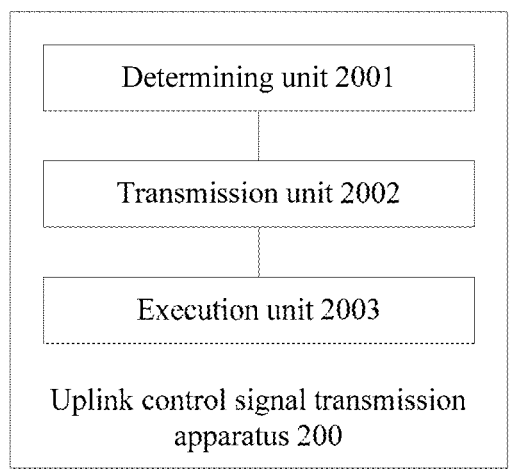

An embodiment of the present invention further provides an uplink control signal transmission apparatus 200. As shown in FIG. 20 or FIG. 21, the apparatus 200 includes:

a determining unit 2001, configured to determine a resource used by a terminal to send an uplink control signal, where the resource includes k resource element groups, and the resource element group includes m resource elements, where k is a positive integer, and m is a positive integer; and a transmission unit 2002, configured to transmit the uplink control signal on the resource.

Optionally, the k resource element groups are nonconsecutive in frequency domain.

Optionally, values of k and m that are corresponding to the resource are determined based on content of the uplink control signal, and the content of the uplink control signal includes one or more of the following content: information used to indicate whether downlink data transmission is correct or incorrect, downlink channel state information, and an uplink scheduling request. Alternatively, values of k and m that are corresponding to the resource are determined based on a service type of downlink data corresponding to the uplink control signal, and the service type of the downlink data corresponding to the uplink control signal includes one or more of the following service types: a mobile broadband service type, a low delay service type, a high reliability service type, and an Internet of Things service type. Alternatively, values of k and m that are corresponding to the resource are determined based on uplink channel quality.

Optionally, the determining unit 2001 is further configured to determine, based on a value of m corresponding to the resource, a codeword corresponding to the resource; and the transmission unit 2002 is specifically configured to transmit the uplink control signal on the resource by using the codeword corresponding to the resource.

Optionally, the determining unit 2001 is further configured to determine, based on one or more of the resource, the content of the uplink control signal, the service type of the downlink data corresponding to the uplink control signal, and control signaling of the downlink data corresponding to the uplink control signal, an antenna port corresponding to the resource; and the transmission unit 2002 is specifically configured to transmit the uplink control signal on the resource by using the antenna port corresponding to the resource.

Optionally, the determining unit 2001 is further configured to determine, based on one or more of the resource, the content of the uplink control signal, the service type of the downlink data corresponding to the uplink control signal, and control signaling of the downlink data corresponding to the uplink control signal, an antenna port corresponding to the resource; and the transmission unit 2002 is specifically configured to transmit the uplink control signal on the resource by using the codeword and the antenna port that are corresponding to the resource.

Optionally, in the resource element group, a ratio of a quantity of resource elements used to carry data to a quantity of resource elements used to carry demodulation reference signals is 2:1; or a ratio of a quantity of resource elements included in the resource element group to a quantity of resource elements that are used to carry demodulation reference signals and that are corresponding to the resource element group is 2:1.

Optionally, the apparatus 200 is a base station, and the transmission unit 2002 is further configured to send an indication message to the terminal, where the indication message is used to indicate the values/value of k and/or m that are/is corresponding to the resource.

Optionally, the apparatus 200 is the terminal, and the transmission unit 2002 is further configured to receive an indication message sent by a base station. The determining unit 2001 is further configured to determine, based on the indication message, a value of a parameter corresponding to the resource used to send the uplink control signal, where the parameter includes k and/or m. The determining unit 2001 is specifically configured to determine the resource based on the value of the parameter corresponding to the resource.

Optionally, the uplink control signal is information used to indicate whether downlink data transmission is correct or incorrect, and the apparatus 200 is the terminal. As shown in FIG. 21, the apparatus 200 further includes an execution unit 2003. The execution unit 2003 is configured to: determine, based on a value of m, a codeword corresponding to the resource; perform channel coding with a rate of 1/k on the information used to indicate whether downlink data transmission is correct or incorrect, to obtain a bit sequence with a length of k; perform BPSK modulation on the bit sequence with a length of k, to obtain a modulated symbol sequence with a length of k; perform spread spectrum on the modulated symbol sequence with a length of k by using the codeword, to obtain k sequences with a length of m; and respectively map the k sequences with a length of m to the k resource element groups in the resource.

Optionally, the information used to indicate whether downlink data transmission is correct or incorrect is information obtained by performing an AND operation on a plurality of pieces of information used to indicate whether downlink data transmission is correct or incorrect.

The units in the apparatus 200 provided in this embodiment of the present invention are configured to perform the method shown in FIG. 10. Therefore, for a beneficial effect of the apparatus 200, refer to the beneficial effect of the method based on FIG. 10. Details are not described herein again.

Figure 22:
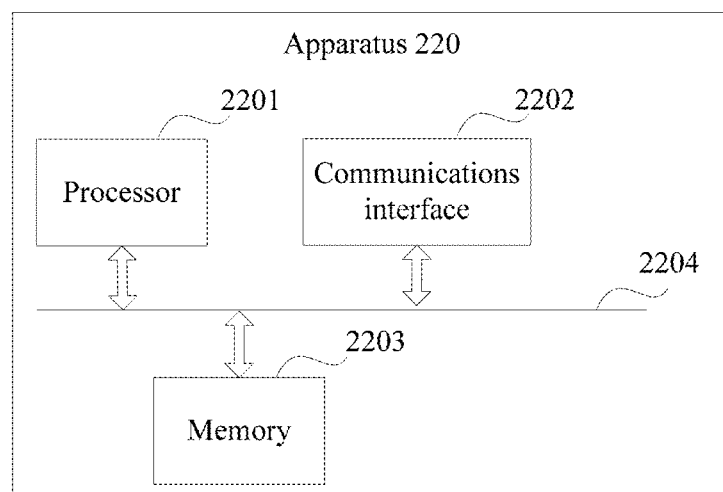
FIG. 22 is a schematic composition diagram of an apparatus according to an embodiment of the present invention.

An embodiment of the present invention further provides an apparatus 220. As shown in FIG. 22, the apparatus 220 includes a processor 2201, a communications interface 2202, a memory 2203, and a bus 2204.

The processor 2201, the communications interface 2202, and the memory 2203 are connected by using the bus 2204. The bus may be a peripheral component interconnect (peripheral component interconnect, PCI) bus, an extended industry standard architecture (extended industry standard architecture, EISA) bus, or the like. The bus 2204 may be classified into an address bus, a data bus, a control bus, and the like. For ease of representation, only one bold line is used to represent the bus in FIG. 22, but this does not mean that there is only one bus or only one type of bus.

The processor 2201 may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processor may implement or execute various example logical blocks, modules, and circuits described with reference to content disclosed in the present invention. Alternatively, the processor may be a combination implementing a computing function, for example, a combination of one or more microprocessors, or a combination of the DSP and a microprocessor.

The memory 2203 may store a computer-executable instruction used by the processor 2201 to perform a corresponding action. Specifically, the memory 2203 may be a memory, a register, a hard disk, a removable hard disk, a compact disc read-only memory (compact disc ROM, CD-ROM), or any well-known storage medium in another form in the art. The memory may be a random access memory (random access memory, RAM), a flash memory, a read-only memory (read-only memory, ROM), an erasable programmable read-only memory (erasable programmable ROM, EPROM), an electrically erasable programmable read-only memory (electrically EPROM, EEPROM), or the like.

The apparatus 220 may be a base station, a terminal, or an uplink control signal transmission apparatus.

Specifically, in a case, the apparatus 220 may be configured to perform step 201 and step 202 in the method shown in FIG. 2. In this case, the apparatus 220 is a base station, the processor 2201 may perform an action performed by the determining unit 1601, and the communications interface 2202 may perform an action performed by the sending unit 1602.

In a case, the apparatus 220 may be configured to perform step 202 and step 203 in the method shown in FIG. 2. In this case, the apparatus 220 is a terminal, the processor 2201 may perform actions performed by the determining unit 1702 and the execution unit 1703, and the communications interface 2202 may perform an action performed by the receiving unit 1701.

In a case, the apparatus 220 may be configured to perform the method shown in FIG. 7. In this case, when the apparatus 220 is a base station, the processor 2201 may perform an action performed by the determining unit 1801, and the communications interface 2202 may perform an action performed by the transmission unit 1802. Alternatively, when the apparatus 220 is a terminal, the processor 2201 may perform actions performed by the determining unit 1801 and the execution unit 1803, and the communications interface 2202 may perform an action performed by the transmission unit 1802.

In another case, the apparatus 220 may be configured to perform the method shown in FIG. 10. In this case, when the apparatus 220 is a base station, the processor 2201 may perform an action performed by the determining unit 2001, and the communications interface 2202 may perform an action performed by the transmission unit 2002. Alternatively, when the apparatus 220 is a terminal, the processor 2201 may perform actions performed by the determining unit 2001 and the execution unit 2003, and the communications interface 2202 may perform an action performed by the transmission unit 2002.

Method or algorithm steps described with reference to the content disclosed in the present invention may be implemented by hardware, or may be implemented by a processor by executing a software instruction. The software instruction may include a corresponding software module. The software module may be stored in a storage medium. An example storage medium is coupled to a processor, so that the processor can read information from the storage medium and write information into the storage medium. Certainly, the storage medium may alternatively be a component of the processor. The processor and the storage medium may be located in a storage device.

A person skilled in the art should be able to be aware that in the foregoing one or more examples, functions described in the present invention may be implemented by hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or special-purpose computer.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on the technical solutions of the present invention shall fall within the protection scope of the present invention.

What is claimed is:

1. A resource indication method, comprising:
   determining, by a base station, a resource used by a terminal to send an uplink control signal; and
   sending, by the base station, indication information to the terminal, wherein the indication information is used to indicate a target parameter, and the target parameter comprises at least one of parameters used by the terminal to determine the resource, wherein the parameters used to determine the resource comprise a first parameter and a second parameter, wherein the target parameter comprises the first parameter or the second parameter, wherein the determining, by a base station, a resource used by a terminal to send an uplink control signal comprises:
   determining the first parameter or the second parameter based on the target parameter;
   determining one of the first parameter or the second parameter other than the target parameter based on a downlink resource; and
   determining, by the base station based on the first parameter and the second parameter, the resource used by the terminal to send the uplink control signal.

2. The method according to claim 1, wherein the first parameter is used to determine a resource group, wherein the resource group comprises the resource, and the second parameter is used to determine the resource in the resource group; or
   the first parameter is used to determine a basic resource index value of the resource, and the second parameter is used to determine an offset resource index value of the resource.

3. The method according to claim 2, wherein the target parameter comprises the first parameter, and the determining, by a base station, a resource used by a terminal to send an uplink control signal comprises:
   determining, by the base station, the first parameter;
   determining, by the base station, the second parameter based on a downlink resource, wherein the downlink resource comprises one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal; and
   determining, by the base station based on the first parameter and the second parameter, the resource used by the terminal to send the uplink control signal.

4. The method according to claim 3, wherein the determining, by the base station, the second parameter based on a downlink resource comprises:
   determining, by the base station, the second parameter based on a start location or an end location of the downlink resource.

5. The method according to claim 2, wherein the target parameter comprises the second parameter, and the determining, by a base station, a resource used by a terminal to send an uplink control signal comprises:
   determining, by the base station, the first parameter based on a downlink resource, wherein the downlink resource comprises one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal;
   determining, by the base station, the second parameter; and
   determining, by the base station based on the first parameter and the second parameter, the resource used by the terminal to send the uplink control signal.

6. The method according to claim 5, wherein the determining, by the base station, the first parameter based on a downlink resource comprises:
   determining, by the base station, the first parameter based on a start location or an end location of the downlink resource.

7. The method of claim 1, wherein the sending, by the base station, indication information to the terminal comprises:
   sending, by the base station to the terminal, a radio resource control (RRC) message or downlink control signaling that comprises the indication information.

8. The method of claim 1, wherein the resource comprises k resource element groups, and the resource element group comprises m resource elements, wherein k is a positive integer, and m is a positive integer.

9. A resource indication method, comprising:
   receiving, by a terminal, indication information sent by a base station; and
   determining, by the terminal based on the indication information, a resource used by the terminal to send an uplink control signal; or determining, by the terminal based on the indication information, a target parameter, wherein the target parameter comprises at least one of parameters used to determine the resource,
   wherein the resource comprises k resource element groups, wherein the resource element group comprises m resource elements, wherein k is a positive integer, and m is a positive integer,
   wherein the uplink control signal is information used to indicate whether downlink data transmission is correct or incorrect, and wherein the method further comprises:
   determining, by the terminal based on a value of m, a codeword corresponding to the resource;
   performing, by the terminal, channel coding with a rate of 1/k on the information used to indicate whether downlink data transmission is correct or incorrect, to obtain a bit sequence with a length of k;
   performing, by the terminal, binary phase shift keying BPSK modulation on the bit sequence with a length of k, to obtain a modulated symbol sequence with a length of k;
   performing, by the terminal, spread spectrum on the modulated symbol sequence with a length of k by using the codeword, to obtain k sequences with a length of m; and
   respectively mapping, by the terminal, the k sequences with a length of m to the k resource element groups in the resource.

10. The method according to claim 9, wherein the parameters used to determine the resource comprise a first parameter and a second parameter; and the first parameter is used to determine a resource group, wherein the resource group comprises the resource, and the second parameter is used to determine the resource in the resource group; or the first parameter is used to determine a basic resource index value of the resource, and the second parameter is used to determine an offset resource index value of the resource.

11. The method according to claim 10, wherein the target parameter comprises the first parameter, and the method further comprises:
  determining, by the terminal, the second parameter based on a downlink resource, wherein the downlink resource comprises one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal.

12. The method according to claim 11, wherein the determining, by the terminal, the second parameter based on a downlink resource comprises:
  determining, by the terminal, the second parameter based on a start location or an end location of the downlink resource.

13. The method of claim 11, wherein the method further comprises:
  determining, by the terminal, the resource based on the target parameter and the second parameter.

14. The method according to claim 10, wherein the target parameter comprises the second parameter, and the method further comprises:
  determining, by the terminal, the first parameter based on a downlink resource, wherein the downlink resource comprises one or more of a frequency domain resource of a downlink control signal corresponding to the terminal, a time domain resource of the downlink control signal, a code domain resource of the downlink control signal, a port number of the downlink control signal, a frequency domain resource of downlink data corresponding to the downlink control signal, a time domain resource of the downlink data corresponding to the downlink control signal, a code domain resource of the downlink data corresponding to the downlink control signal, and a port number of the downlink data corresponding to the downlink control signal.

15. The method according to claim 14, wherein the terminal determines the first parameter based on the downlink resource, and the method further comprises:
  determining, by the terminal, the first parameter based on a start location or an end location of the downlink resource.

16. The method of claim 14, wherein the method further comprises:
  determining, by the terminal, the resource based on the target parameter and the first parameter.

17. The method according to claim 9, wherein the information used to indicate whether downlink data transmission is correct or incorrect is information obtained by performing an AND operation on a plurality of pieces of information used to indicate whether downlink data transmission is correct or incorrect.

* * * * *